US010785049B2

(12) United States Patent
Brun et al.

(10) Patent No.: US 10,785,049 B2
(45) Date of Patent: Sep. 22, 2020

(54) CONFIGURING A COMMON AUTOMATION SYSTEM CONTROLLER

(71) Applicant: Siemens Schweiz AG, Zurich (CH)

(72) Inventors: Gerhard Brun, Lucerne (CH); Heinrich Meier, Feusisberg (CH); Herbert Meier, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/515,430

(22) PCT Filed: Sep. 30, 2014

(86) PCT No.: PCT/EP2014/070920
§ 371 (c)(1),
(2) Date: Mar. 29, 2017

(87) PCT Pub. No.: WO2016/050279
PCT Pub. Date: Apr. 7, 2016

(65) Prior Publication Data
US 2017/0214541 A1 Jul. 27, 2017

(51) Int. Cl.
*H04L 12/28* (2006.01)
*G05B 19/042* (2006.01)
(Continued)

(52) U.S. Cl.
CPC .......... *H04L 12/2803* (2013.01); *G05B 13/02* (2013.01); *G05B 15/02* (2013.01);
(Continued)

(58) Field of Classification Search
None
See application file for complete search history.

(56) References Cited

U.S. PATENT DOCUMENTS 7,904,186 B2 * 3/2011 Mairs ................... G09B 29/007
700/19
8,050,801 B2 11/2011 Richards et al. ............. 700/276
(Continued)

FOREIGN PATENT DOCUMENTS

CN 101427239 A 5/2009 ............ G06F 15/16
CN 103048959 A 4/2013 ........... G05B 19/418
(Continued)

OTHER PUBLICATIONS

Voelter, Markus et al., "Product Line Engineering Using Domain-Specific Languages," 15$^{th}$ International Software Product Line Conference (SPLC), IEEE, 10 pages, 2011.
(Continued)

*Primary Examiner* — Carlos R Ortiz Rodriguez
(74) *Attorney, Agent, or Firm* — Slayden Grubert Beard PLLC

(57) ABSTRACT

A common automation system controller configured using a graphical approach for use in a building automation system is provided. There is an increasing demand for flexible and adaptable room or building automation applications with an easy and intuitive way for application configuration. In pre-engineering as well as during installation and commissioning, the application configuration for preloaded or loadable device needs to be easily changeable and can be used for operating and/or monitoring.

16 Claims, 16 Drawing Sheets

(51) Int. Cl.
*G06F 8/34* (2018.01)
*G05B 13/02* (2006.01)
*G05B 15/02* (2006.01)

(52) U.S. Cl.
CPC .......... *G05B 19/0426* (2013.01); *G06F 8/34* (2013.01); *G05B 2219/23255* (2013.01); *G05B 2219/23261* (2013.01); *G05B 2219/23273* (2013.01); *G05B 2219/25067* (2013.01); *G05B 2219/2642* (2013.01)

(56) References Cited

U.S. PATENT DOCUMENTS

| | | | |
|---|---|---|---|
| 2006/0058900 A1 | 3/2006 | Johanson et al. | 700/83 |
| 2006/0058923 A1 | 3/2006 | Kruk et al. | 700/275 |
| 2007/0143451 A1 | 6/2007 | Huth et al. | 709/220 |
| 2010/0049335 A1 | 2/2010 | Assarsson et al. | 700/9 |
| 2013/0085608 A1 | 4/2013 | Bornside et al. | 700/276 |
| 2013/0096695 A1 | 4/2013 | Meyer | 700/2 |

FOREIGN PATENT DOCUMENTS

| | | | |
|---|---|---|---|
| CN | 103842735 A | 6/2014 | F24F 11/00 |
| WO | 2016/050279 A1 | 4/1916 | G05B 19/042 |
| WO | 2008/040455 A1 | 4/2008 | G05B 15/02 |
| WO | 2010/094303 A1 | 8/2010 | G05B 19/042 |
| WO | 2013/050333 A1 | 4/2013 | G05B 15/02 |

OTHER PUBLICATIONS

International Search Report and Written Opinion, Application No. PCT/EP2014/070920, 17 pages, dated Jun. 24, 2015.
Chinese Office Action, Application No. 201480082355.8, 12 pages, dated Oct. 8, 2018.

\* cited by examiner

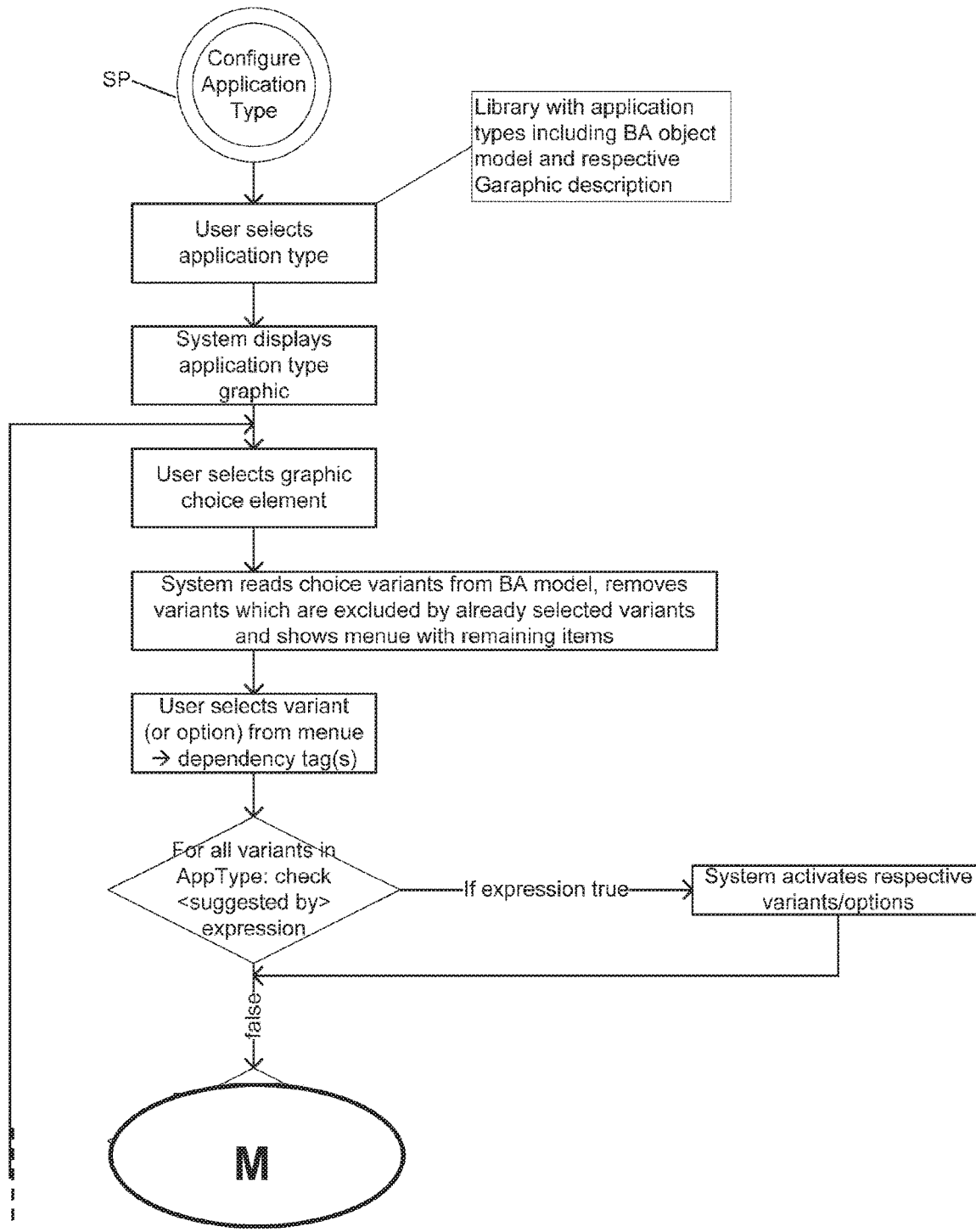

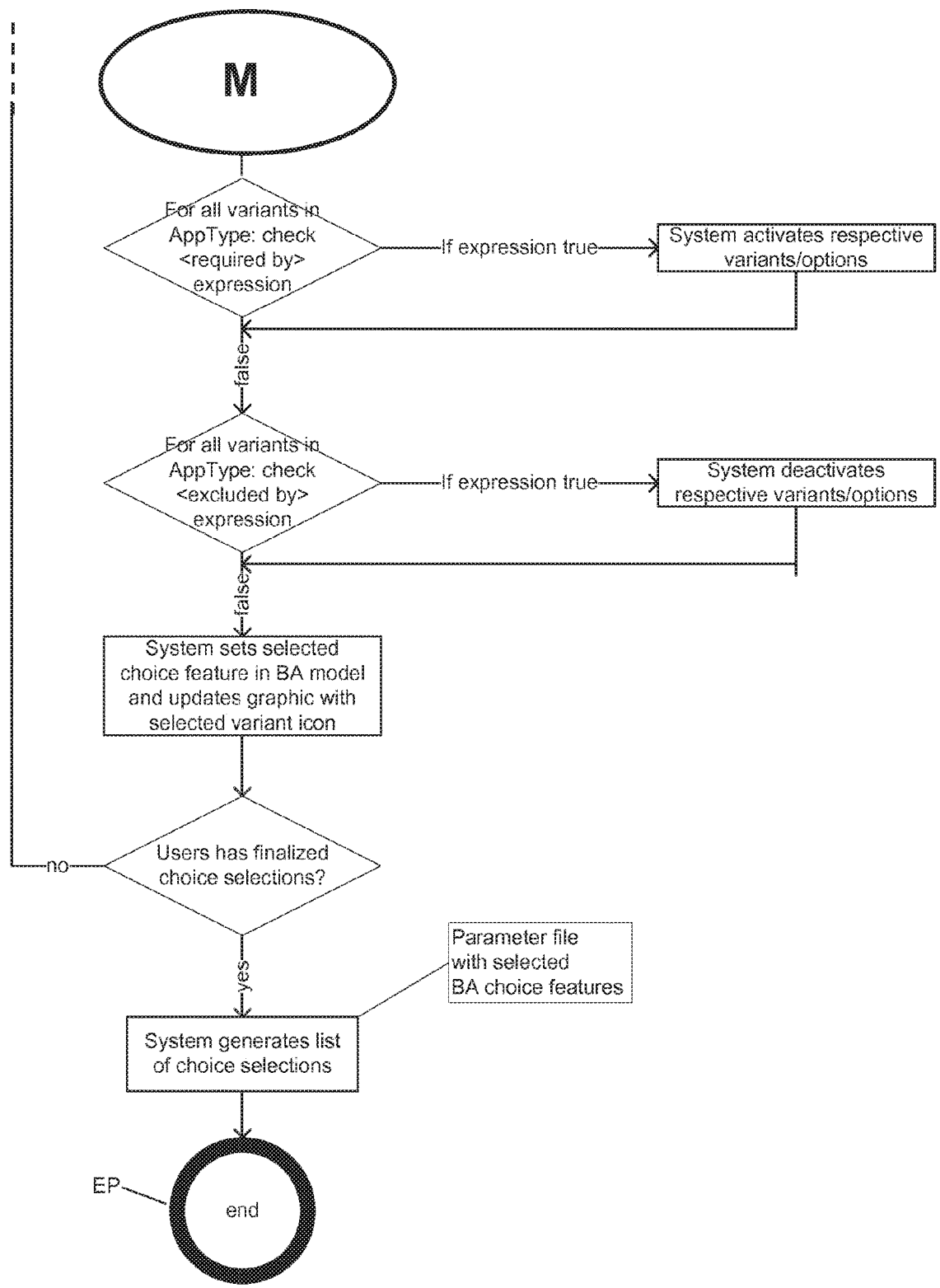

CONFIGURING A COMMON AUTOMATION SYSTEM CONTROLLER

CROSS-REFERENCE TO RELATED APPLICATIONS

This application is a U.S. National Stage Application of International Application No. PCT/EP2014/070920 filed Sep. 30, 2014, the contents of which is hereby incorporated by reference in their entirety.

FIELD OF THE INVENTION

This application relates to the field of building systems and, more particularly, to controllers used in a building automation system (BAS).

BACKGROUND

Building automation systems encompass a wide variety of systems that aid in the monitoring and control of various aspects of building operation. Building automation systems (which may also be referred to herein as "building control systems") include security systems, fire safety systems, lighting systems, shading systems, and heating, ventilation, and air conditioning (HVAC) systems. Lighting systems shading systems, and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation. In building automation systems, several control stations connected via an Ethernet or another type of network may be distributed throughout one or more building locations, each having the ability to monitor and control system operation.

The typical building automation system (including those utilizing the Apogee® Insight® Workstation or Desigo Insight/CC) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes changes to parameters such as temperature and lighting, and/or similar parameters.

The central control station and field panels are in communication with various field devices, otherwise known as "points". Field devices are typically in communication with field panels of building automation systems and are operative to measure, monitor, and/or control various building automation system parameters. Example field devices include lights, blinds, thermostats, damper actuators, alarms, HVAC devices, sprinkler systems, speakers, door locks, and numerous other field devices as will be recognized by those of skill in the art. These field devices receive control signals from the central control station and/or field panels. Accordingly, building automation systems are able to control various aspects of building operation by controlling the field devices.

Large commercial and industrial facilities have numerous field devices that are used for environmental control purposes. Many of these field devices are controllers that have been configured for a specific type of control and communication (such as BACnet). Many variants of a field device are manufactured to address the different types of environments and uses of the controllers. For example, variants of controllers are needed to address the different operating environments such as 12 volt system, 24 volt system, steam valves, fan control, dual duct, etc. . . . Thus, many variants of the hardware and software must be developed and maintained.

The configuration of controllers for building automation systems especially for large commercial and industrial facilities is onerous, inflexible and often error-prone work.

SUMMARY

One embodiment provides a method for configuring a common automation system controller, comprising: providing a library of application types and application type parts wherein an application type and an application type part comprising a building automation object model and a graphical representation; selecting an application type from the library of application types; displaying the graphical representation of the selected application type on a graphical output device, wherein the graphical representation of the application type comprises user selectable elements of the respective application type parts of the application type for configuring the application type; and configuring the application type by configuring the respective application type parts of the application type by selecting graphical elements representing choice objects providing variants and options, wherein based on dependency rules only such graphical elements of the application type parts which are compatible to the selected graphical elements are provided on the graphical output device.

In one embodiment, the method further comprises generating loadable configuration data by a configuration manager, wherein the configuration data comprising information regarding the selected choice objects represented by graphical elements.

In one embodiment, the method further comprises generating a graphical user interface for operating and/or monitoring the common automation system controller, based on the building automation object model, the graphical representation of the application type and the selected choice objects represented by graphical elements.

In one embodiment, the graphical elements for the graphical user interface are preloaded on the common automation system controller.

In one embodiment, the graphical elements for the graphical user interface are provided by a remote infrastructure.

In one embodiment, the method further comprises determining if the selected application type employs static binding or dynamic binding; loading the application type in a memory of the common automation system controller by a processor if dynamic binding is determined, where the at least one application type has a plurality of functions including an application interface; binding the at least one application type resulting in an executable application stored in the memory, where the application interface is specific to the functions employed; and starting with the processor the executable application stored in the memory.

In one embodiment, the dependency rules having logical expressions for determining if choice object variants or options represented by graphical elements are excluded, required or suggested.

In one embodiment, the selectable graphical elements for configuring the application type comprising Hardware and/or Software elements.

In one embodiment, the application type employs positive or negative variability.

In one embodiment, unnecessary structural parts of the plurality of structural parts are removed during binding.

In one embodiment, the application type can be part of an application type library or pre-loaded on the common automation controller.

Another embodiment provides a non-transient computer-readable medium comprising instructions for a method for configuring a common automation system controller as disclosed above.

Another embodiment provides a computer program product comprising instructions for a method for configuring a common automation system controller as disclosed above.

Another embodiment provides a common automation system controller, comprising: a memory; an input/output interface; and a processor coupled to the memory executing an application with an application type with functions for a building automation system, wherein the application type is represented by the compiled application by an executable instance comprising an application interface specific to the functions employed and the input/output of the instance is coupled to mechanical equipment, wherein the executable instance does automatically align in the building automation system, based on an application type configuration, wherein the configuration is based on dependency rules.

In one embodiment, the common automation system controller further comprises a mechanism for generating a graphical user interface for operating and/or monitoring the common automation system controller based on the building automation object model, the graphical representation of the application type and the selected choice objects represented by graphical elements.

In one embodiment, the application type is hierarchically configured with objects associated with the building automation system.

In one embodiment, the common automation system controller further comprise an interface to a remote infrastructure for providing the building automation object model configuration for the remote infrastructure.

In one embodiment, the remote infrastructure generates the graphical user interface for operation and/or monitoring for the common automation system controller.

Another embodiment provides a building automation system, comprising a plurality of common automation system controller as disclosed above, wherein the common automation system controllers are coupled via a building automation network.

BRIEF DESCRIPTION OF THE DRAWINGS

Example aspects and embodiments of the invention are described with reference to enclosed figures.

FIGS. 5A and 5B illustrate a depiction of two diagrams of structural variability that are supported by the common automation system controller 128 of FIG. 1, wherein FIG. 5A illustrates an example regarding positive variability and FIG. 5B illustrates an example regarding negative variability;

FIGS. 14A and 14B illustrate an exemplary flow diagram for performing a graphical configuration of a common automation system controller;

DETAILED DESCRIPTION

Figure 1:
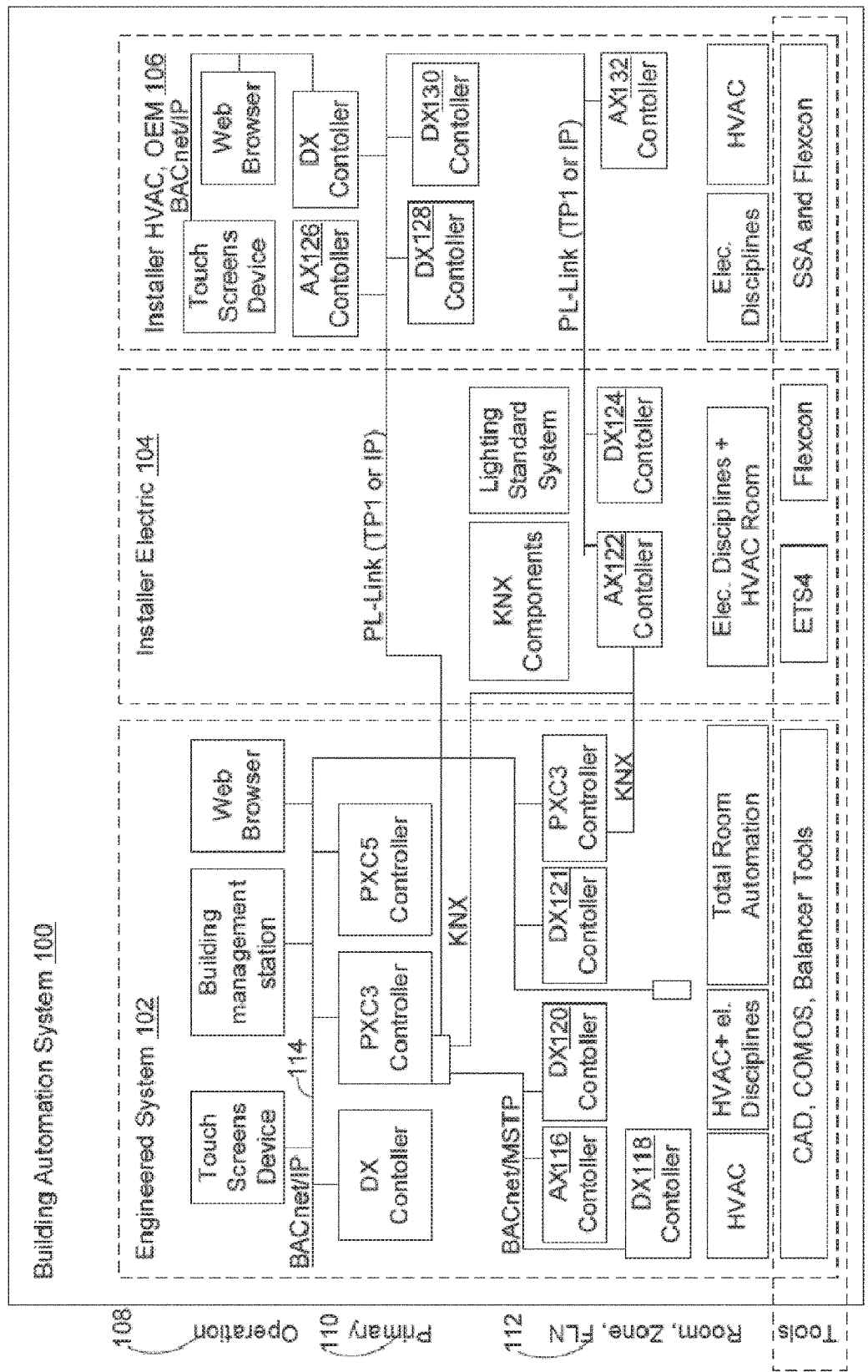
FIG. 1 illustrates an exemplary topology diagram for a building automation system (BAS) having field devices.

Embodiments of the invention provide mechanisms for flexible and adaptable room automation applications with an easy and intuitive way for application configuration for building automation system controllers.

Some embodiments provide a method for configuring a common automation system controller, the method comprising:

providing a library of application types and application type parts wherein an application type and an application type part comprising a building automation (BA) object model and a graphical representation;

selecting an application type from the library of application types;

displaying the graphical representation of the selected application type on a graphical output device, wherein the graphical representation of the application type comprises user selectable graphical elements of the respective application type parts (ATP1, ATP2) of the application type for configuring the application type;

configuring the application type by configuring the respective application type parts of the application type by selecting graphical elements representing choice objects providing variants and options, wherein based on dependency rules only such graphical elements of the application type parts which are compatible to the selected graphical elements are provided on the graphical output device. The provided controller configuration approach reduces the number of unique hardware variants and field configurations of field devices by using common a controller and limiting the number of interface variants and the number of housings used with field devices. The suggested graphical way for application configuration also provides all required information for automatic operation & monitoring a building automation system and/or components of such system. The operation & monitoring graphic serves for all device and room instances based on the same set of feature selections. The method provides graphical configuration for loadable and for preloaded applications which can be adapted to typical main job-specific requirements by configuring parameters only (without programming). The method can be used for configuring and adapting loadable and/or preloaded applications. Furthermore the inventive method allows configuring a large number of applications respective rooms with same features selections and configuration parameters. This increases the efficiency in engineering large systems like building automation systems for large buildings (e.g. skyscrapers or plants).

Advantageously the selected choice objects (representing the selected features for the configuration) and the respective BA objects keep a mutual reference in order to read and write properties.

In one embodiment the method further comprises:
generating loadable configuration data by a configuration manager, wherein the configuration data comprising information regarding the selected choice objects represented by graphical elements. The configuration data can be stored e.g. in a file, a data block or a database. The information in the configuration file can be represented using XML (Extensible Markup Language) or another adequate format. The configuration manager can be a software module executable on a processor unit of the controller.

In a further embodiment the method further comprises:
generating a graphical user interface for operating and/or monitoring the common automation system controller, based on the building automation object model, the graphical representation of the application type and the selected choice objects represented by graphical elements. Generating a graphical user interface can be accomplished local on controller site or in a remote infrastructure which is interfaced with the controller. The remote infrastructure can be a remote server or processing means provided in a cloud (e.g. as software as a service).

The use of graphical application configuration mechanisms as well as graphical operation & monitoring capabilities for building and room automation leads in today's mostly complex systems to benefits in the engineering of such systems especially regarding savings in costs and time. Furthermore a graphical approach is more intuitive to a user and this causes less errors and less testing efforts.

Multiple graphical representations for user interfaces can be generated. So it is possible that a user can choose between different user interfaces or switch between different user interfaces (e.g. between 2D or 3D presentations).

In a further embodiment the graphical elements for the graphical user interface are preloaded on the common automation system controller. This enables to generate the graphical user interface in an efficient way.

In a further embodiment the graphical elements for the graphical user interface are provided by a remote infrastructure (e.g. remote Server, Cloud). This allows a flexible generation of graphical user interface for different controllers or applications.

In a further embodiment the method further comprises:
determining if the selected application type employs static binding or dynamic binding;
loading the application type in a memory of the common automation system controller by a processor if dynamic binding is determined, where the at least one application type has a plurality of functions including an application interface;
binding the at least one application type resulting in an executable application stored in the memory, where the application interface is specific to the functions employed; and
starting with the processor the executable application stored in the memory. Either during engineering (i.e., static binding) or at run time (i.e., dynamic binding) respective choices of options and alternatives may be selected by the user. These options increase the flexibility for a user when configuring a controller. If static binding of the application type is determined and employed, then the selected application type is parameterized and bound. If dynamic binding is determined and employed, then unnecessary parts of the application type are removed at initialization or upon starting.

In a further embodiment the dependency rules having logical expressions for determining if choice object variants or options represented by graphical elements are excluded, required or suggested. Based on the selection of hardware features only selectable software features in each case will be provided for the user on the graphical user interface. This is achieved by automatically applying predefined rules between features from the building automation model. These dependency rules may work between hardware choices, between software choices and between hardware and software choices.

The complete dependency rule set may be defined in the building automation object model and kept with the building automation choice objects or choice elements (means the selectable graphical elements) which is part of the respective application type.

In a further embodiment the selectable graphical elements (e.g. choice elements) for configuring the application type comprising Hardware elements and/or Software elements. This allows that a user has a full and comprehensive view on the application types during configuration regarding respective hardware and software aspects.

In a further embodiment the application type employs positive or negative variability. Both of the variability approaches may be used with the common automation system controller. This allows a high degree of flexibility in configuring a controller. When using a positive variability, additional parts are added to a core structure or application. When using negative variability, then an overall structure has parts or modules removed.

In a further embodiment unnecessary structural parts of the plurality of structural parts are removed during binding. By jettison unnecessary parts the efficiency of the controller is increased, especially during runtime.

In a further embodiment the application type can be part of an application type library or pre-loaded on the common automation controller. An application type can be pre-loaded on the common automation controller, e.g. in a standard or default delivery configuration version. An application type can also be an element of a library from which chosen application types can be populated on the common automation controller. A user can chose both options or a mix of these options.

Further embodiments of the invention include a non-transient computer-readable medium (e.g. CD or USB stick) and computer program product (e.g. a program module written in an adequate programming language, e.g. C++, Java) comprising instructions for performing the inventive method for configuring a common automation system controller. The computer-readable medium and the computer program product having program segments for, when executed on a computer device, causing the computer device (e.g. workstation, desktop computer, Laptop, tablet) to implement the inventive method.

Other embodiments provide a common automation system controller, the controller comprising:
- a memory;
- an input/output interface; and
- a processor coupled to the memory executing an application with an application type with functions for a building automation system (BAS), wherein the application type is represented by the compiled application by an executable instance comprising an application interface specific to the functions employed and the input/output of the instance is coupled to mechanical equipment, wherein the executable instance does automatically align in the building automation system (BAS), based on an application type configuration, wherein the configuration is based on dependency rules.

Nowadays large commercial and industrial facilities have numerous field devices that are used for environmental control purposes. Many of these field devices are controllers that have been configured for a specific type of control and communication (such as BACnet). Many variants of a field device have to be manufactured to address the different types of environments and uses of the respective controllers. For example, variants of controllers are needed to address the different operating environments such as 12 volt system, 24 volt system, steam valves, fan control, dual duct, etc. . . . Thus, many variants of the hardware and software must be developed and maintained.

The disclosed common automation system controller provides generic mechanisms for configuring and adapting applications for controlling different types of environments. The inventive common automation system controller reduces the number of unique hardware variants and field configurations of field devices. Furthermore the inventive common automation system controller limits the number of interface variants and the number of housings used with field devices. Field devices may include field common automation system controllers. The common controller may be configured in the field with an adequate graphical user interface.

In a further embodiment the common automation system controller further comprises a mechanism (e.g. suitable software or firmware executed in the processor of the controller) for generating a graphical user interface for operating and/or monitoring the common automation system controller based on the building automation (BA) object model, the graphical representation of the application type and the selected choice objects represented by graphical elements. Using local processor means of the controller an adequate and matched graphical user interface can be efficiently generated.

In a further embodiment the application type is hierarchically configured with objects associated with the building automation system (BAS).

The various objects associated with the may be organized in a hierarchical structure. The aggregated structures may represent different views and navigation paths on various devices in the building automation system (BAS). The aggregation enables system functions and infrastructures, networks and subsystems, rooms and supporting systems to have parameters and data grouped together. Aggregation further provides the ability to nest and encapsulate application control modules and nodes. By using such an approach, configuration and handling of data within the building automation system (BAS) becomes more efficient and less prone to errors.

In a further embodiment the common automation system controller further comprises an interface to a remote infrastructure (e.g. a remote server or a cloud computing infrastructure) for providing the building automation (BA) object model configuration for the remote infrastructure. As interface a wired (e.g. LAN-connection) or a wireless communication (e.g. WLAN) could be used.

In a further embodiment the remote infrastructure generates the graphical user interface for operation and/or monitoring for the common automation system controller. The generated graphical user interface can be provided for the controller via the interface as a service (e.g. SaaS or IaaS; software or infrastructure as a service).

The generated the graphical user interface for operation and/or monitoring can be used directly on the controller or the respective field device without further engineering efforts. Furthermore the generated the graphical user interface for operation and/or monitoring is automatically aligned to the configuration of the respective controller or the respective field device, e.g. via uploading in a web browser of the field device (in this scenario the field device is acting as a client device). Furthermore the automatically configured graphic UI (based on the selected features) can be uploaded and displayed on a client device like PC, notebook, tablet or web browser.

Other embodiments provide a building automation system, comprising a plurality of the inventive common automation system controllers, wherein the common automation system controllers are coupled via a building automation network. A building automation system (BAS) controls IT-based typically mechanical and electrical installations in a building, such as HVAC, lighting, and power systems. The inventive common automation system controllers can be employed in all control tiers of the building automation system according to an adequate configuration in each case. This decreases the variety of different controllers and increases maintainability of the building automation system.

An example approach for configuration of field devices is described.

FIG. 1 illustrates an exemplary topology diagram 100 for a building automation system (BAS) having field devices. The topology diagram 100 of FIG. 1 is divided into engineered systems 102, installer electronic 104, and installer HVAC, OEM 106, representing different possible distribution channels. The hierarchy of the topology diagram 100 may be divided into operations 108, primary plant 110, and Room/Zone 112. A network 114, such as a BACnet/IP network, may connect the different control systems and fielded devices in BAS 100. Field devices may include field common automation system controllers, such as 116-132. Some of the common automation system controllers may operate building systems such as opening and closing blinds, electrical systems, and HVAC systems.

Figure 2:
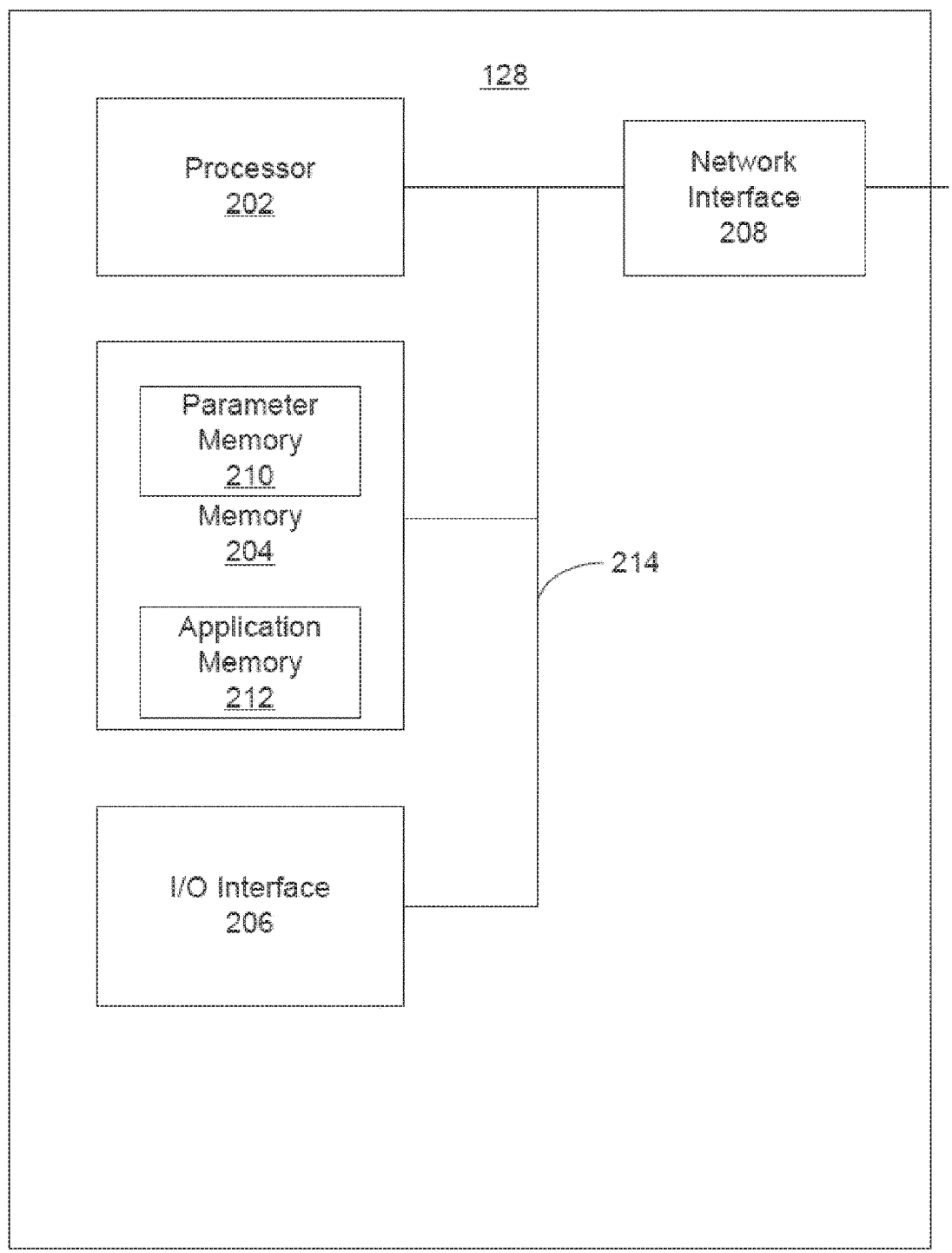
FIG. 2 illustrates an exemplary block diagram of a common automation system controller 128 of FIG. 1 in accordance with an example implementation.

FIG. 2 illustrates an exemplary block diagram of a common automation system controller 128 of FIG. 1 in accordance with an example implementation. The common automation system controller 128 may have a processor 202, memory 204, I/O interface 206, and network interface 208 connected by one or buses 214. The processor 202 may be a general purpose microprocessor, microcontroller, application specific processor, reduced instruction set processor, digital logic configured to operate as a state machine, analog circuits configured to operate as a state machine, or a combination of analog and digital circuits operating as a state machine.

The memory 204 may be static, dynamic or a combination of memory types. The memory 204 may be further subdivided into parameter memory 210 and application memory 212. The parameter memory 210 may store transient programs and parameters. The application memory 212 may store an operating system and other applications that may be permanently resident on the common automation system controller 128.

The network interface 208 may couple the controller 128 to a network, such as a BACnet/IP network. Data and control data may be exchanged with other devices in the BAS via the network interface. The I/O Interface 206 enables control and communication with actuators and sensors. The I/O Interface 206 may be implemented as a separate assembly that is coupled to the I/O interface 206. The I/O Interface 206 may also, in some implementations, provide a serial interface for configuring or communication with the common automation system controller 128. In other implementations, the network interface 208 may be used for configuring the common automation system controller 128. In yet other implementations, both a serial interface and network interface 208 may be used to communicate with the controller 128. Via the network interface 208 a connection to a remote infrastructure (e.g. remote server or cloud infrastructure) can be established. The remote infrastructure can provide services to the controller 128. An example for a service can be that the remote infrastructure provides an (according to the respective configuration) aligned graphical user interface (UI) for the controller 128.

Figure 3:
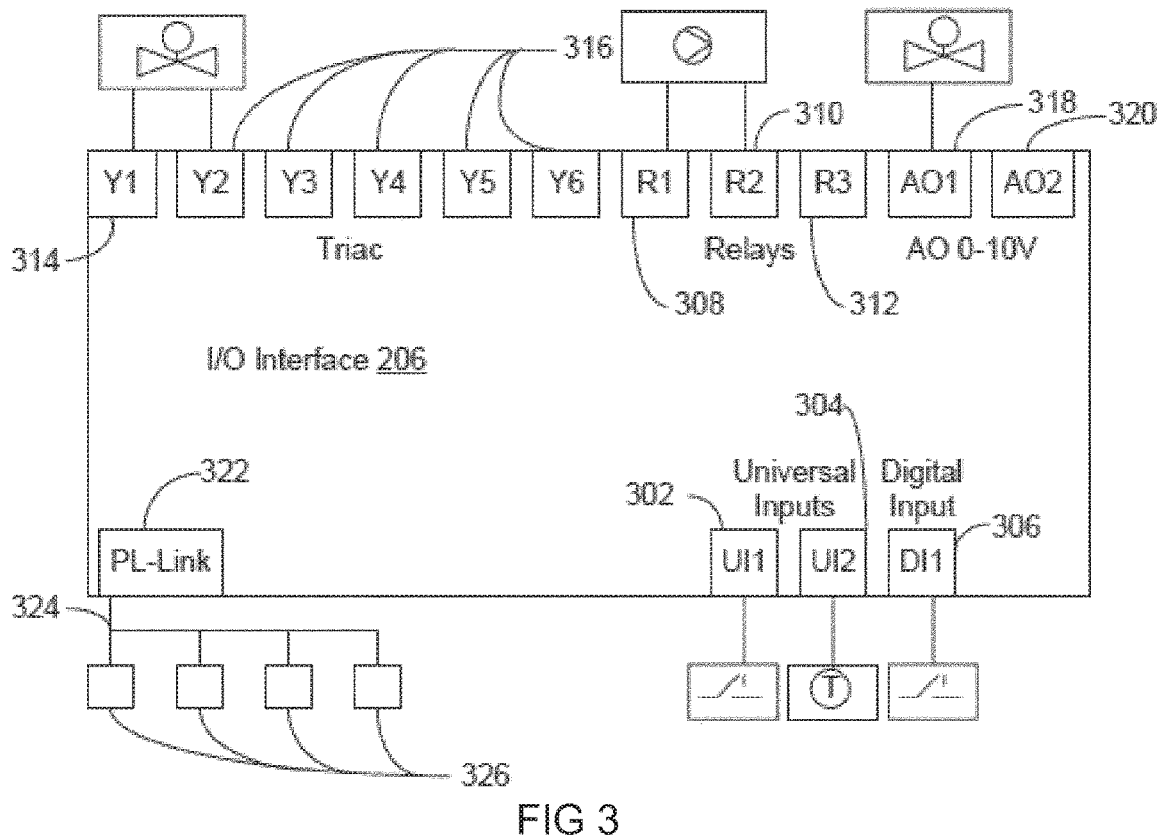
FIG. 3 illustrates an exemplary block diagram of the I/O interface 206 of FIG. 2.

FIG. 3 illustrates an exemplary block diagram of the I/O interface 206 of FIG. 2. The I/O interface 206 may include universal or analog inputs 302 and 304, digital input 306, relays connections R1 308, R2 310, and R3 312. Alternating current (AC) outputs Y1-Y6 314-316 may be directly connected to small fans and other AC devices. Analog outputs A01 and A02 318-320 may be used for variable control of devices, such as the speed of a fan or opening of a valve. In the current example, a PL-Link 322 is provided for integration with other field-deployed buses 324 that may enable additional communication with sensors, actuators, and other devices 326. In other implementations, different numbers and types of interface connections may be provided for inputting and outputting of data and control signals from the common automation system controller 128 via I/O interface 206.

Figure 4:
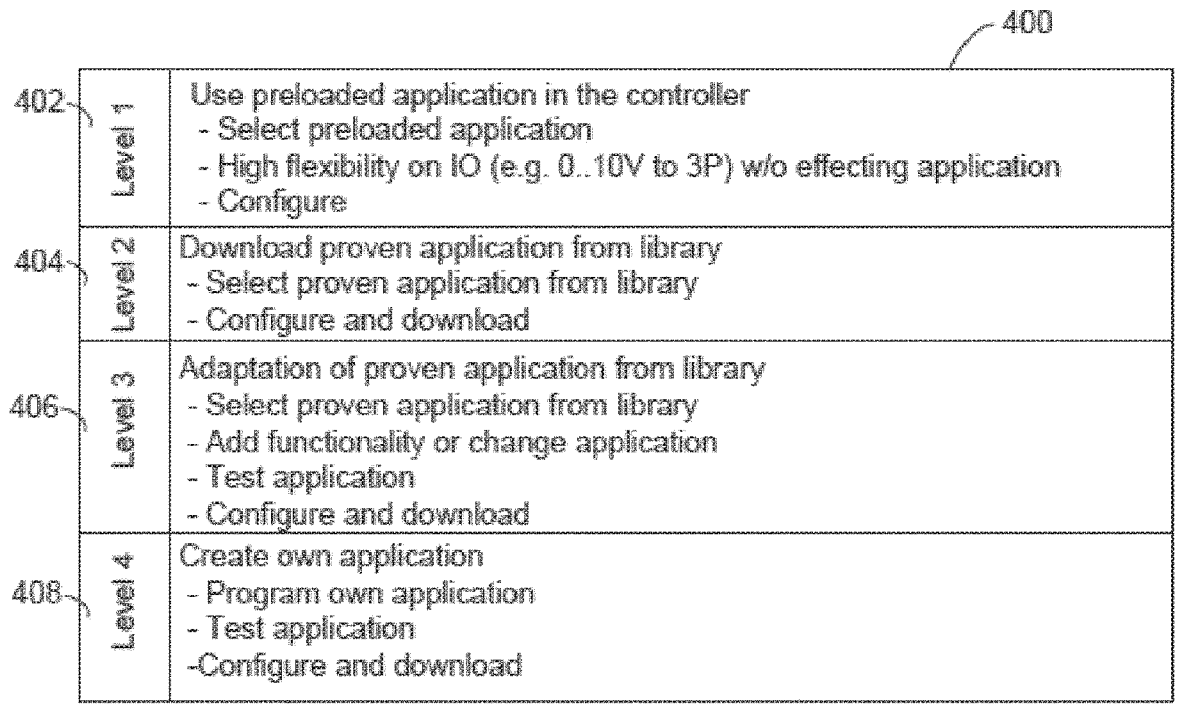
FIG. 4 illustrates a chart of the levels of engineering flexibility achieved with the use of a common automation system controller, such as common automation system controller 128 of FIG. 1.

FIG. 4 illustrates a chart of the levels of engineering flexibility achieved with the use of a common automation system controller, such as common automation system controller 128 of FIG. 1.

Level 1 402 of engineering flexibility is achieved with the use of preloaded applications in the common automation system controller 128. By having preloaded applications on the controller, flexibility of IO may be maintained for configuring different parameters, such as voltage, without affecting the actual performance of the application. Since the applications are not modified, time and resources are saved by not having to test changes. In Level 1 the whole application is pre-engineered respectively pre-programmed and pre-tested. In Level 1 neither further uploads nor further functional tests regarding the control program are required. The configuration is accomplished directly on the device via dynamic binding.

Level 2 404 of engineering flexibility may be achieved by having a library of proven applications. The application is selected from the library, configured and downloaded to the common automation system controller 128. The wiring and configuration has to be tested but further functional tests regarding the control program are not required.

Level 3 406 of engineering flexibility starts with a proven application from a library, but the functionality of that application is changed or added to. These changes or additions typically require more extensive testing than Level 1 204 or Level 2 404. Level 3 406 engineering flexibility also requires more development time as new or additional functionality is being developed.

Level 4 408 of engineering flexibility has custom or unique applications being employed on the common automation system controller 128. Such custom or unique applications are the most labor intensive level of engineering and often have maintainability issues. Further, such approaches require the most intensive system testing to verify that they will fully function in a BAS. But, there are times where unique customer systems require Level 4 engineering flexibility. Examples of such unique customer systems may include retrofitted BAS to antiquated HVAC systems.

As described, all the different levels of engineering flexibility may be used with the common automation system controller 128. This four level approach is opposed to the common practice in the BAS and HVAC industry to deploy controllers that have dedicated applications (Level 1 402 of engineering flexibility). The four level approach results in a symmetry and consistency of applications executed by the common automation system controller 128 with regards to structures, functions, behavior, parameterization, operation & monitoring, and documentation. The symmetry and consistency indirectly results in a reduction of cost and time associated with preparing and deploying the common automation system controller 128.

Figure 5A:
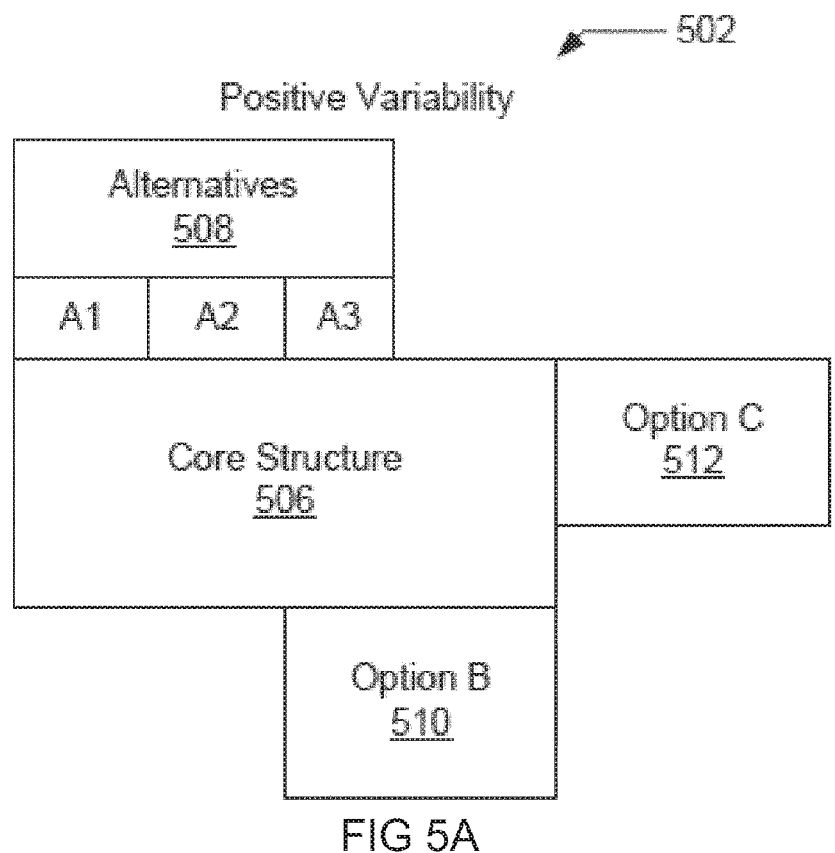
Figure 5B:
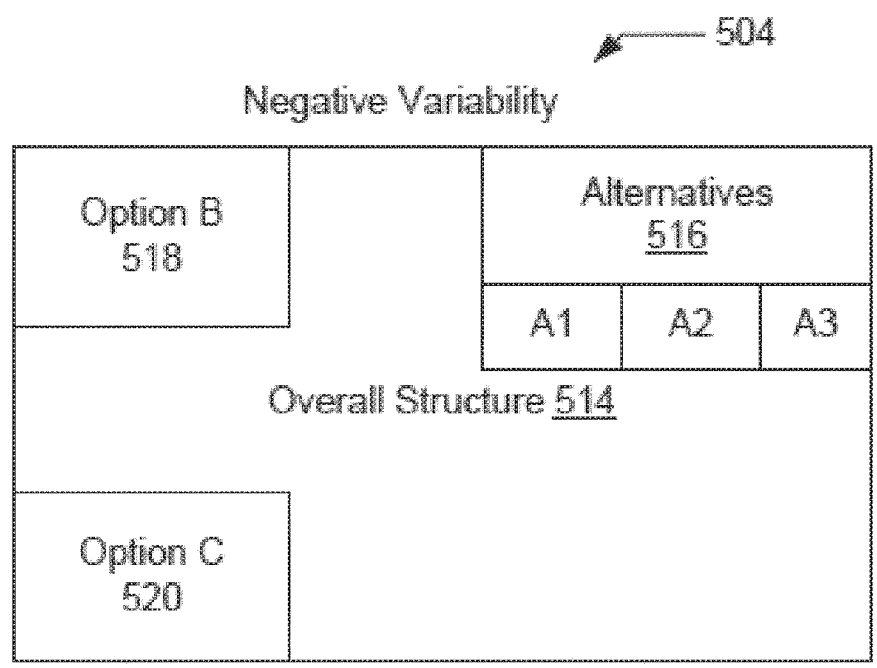

In FIGS. 5A and 5B, two diagrams 502 and 504 of structural variability that may be supported by the common automation system controller 128 of FIG. 1 are depicted. Diagram 502 depicts positive variability, where additional parts are added to a core structure or application. The core structure 506 has alternatives A1, A2, and A3 508. Additionally, options B 510 and C 512 may be added to the core structure.

The diagram 504 according to FIG. 5B depicts Negative Variability, where the overall structure has parts or modules removed. The overall structure 514 may have alternatives A1, A2 A3 516, option B 518 and Option C 520 removed. Both of the variability approaches may be used with the common automation system controller 128.

Figure 6:
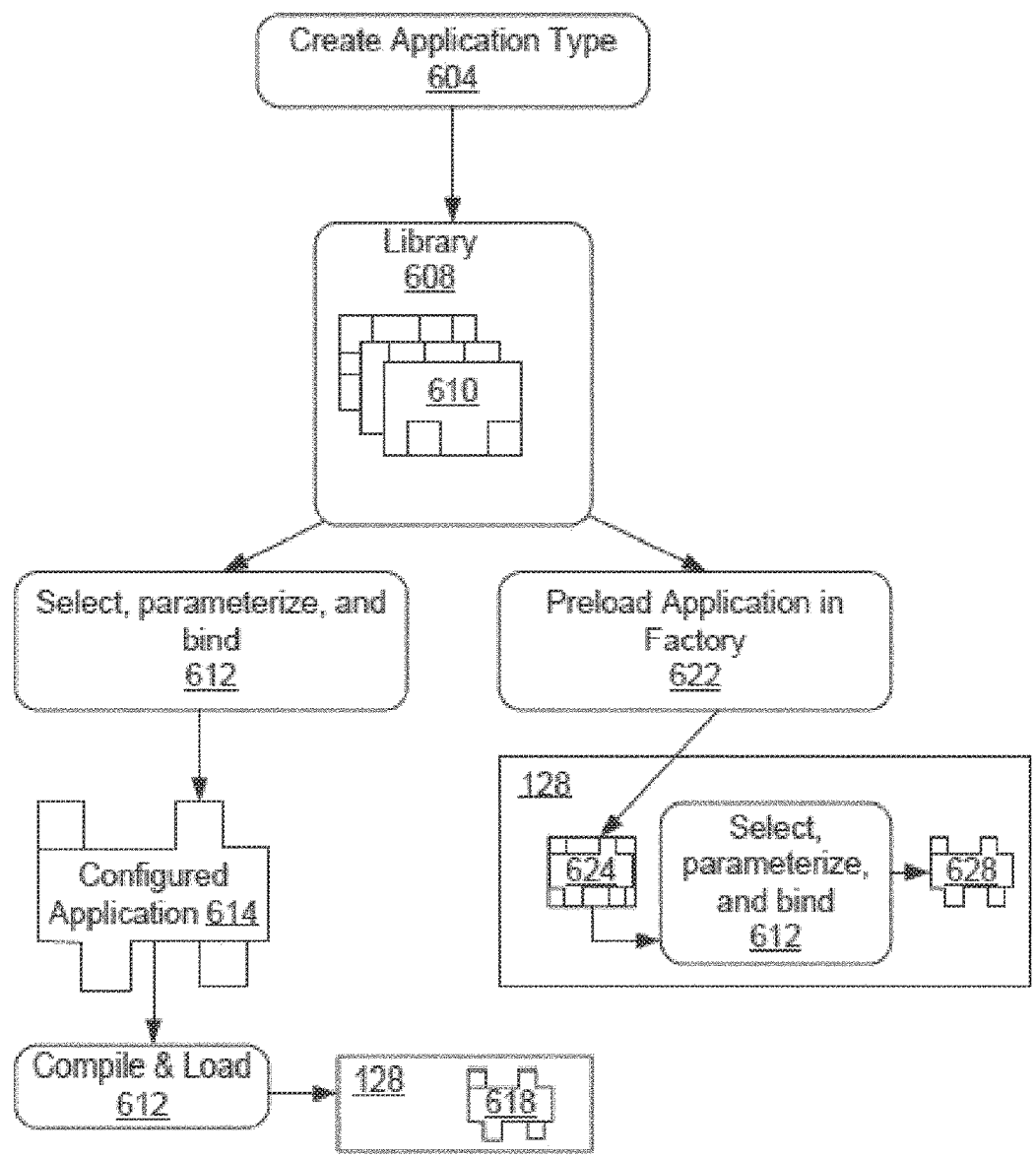
FIG. 6 illustrates a depiction of an approach for implementing structural variability in the configuration of the common automation system controller 128 of FIG. 1.

FIG. 6 illustrates a depiction of an approach for implementing structural variability in the configuration of the common automation system controller 128 of FIG. 1. Static binding 602 of functions at compile time is typically used for applications with negative variability. The unnecessary features or optional features are removed prior to or during compiling and loading of the application. An application 604 may be created or formed by accessing a library 608 of application types 610. The application type 610 is selected and parameterized 612. The resulting application 614 may then be compiled and loaded 616. The compiling may occur with a graphical object oriented language in the current example, or in other implementations programming language such as C, C++, Java, Visual Basic, Python, or other high level language may be employed. In the current example, the binding may occur during parameterization 612. The resulting compiled application 618 may then be loaded onto the common automation system controller, such as common automation system controller 128.

Dynamic binding 620 may be used to create an application by selecting an application type 604 from a library 608 of application types 610. The application type with dynamic binding will typically be pre-loaded 622 in the application memory of a common automation system controller, such as application memory 212 of the common automation system controller 128. When the common automation system controller 128 is initialized or booted, the preloaded applications 624 are selected and parameterized with binding of the functions also occurring 626. The resulting parameterized or configured application 628 is then executed by the common automation system controller 128. As described, the same common automation system controller may be used with negative variability or positive variability.

Figure 7:
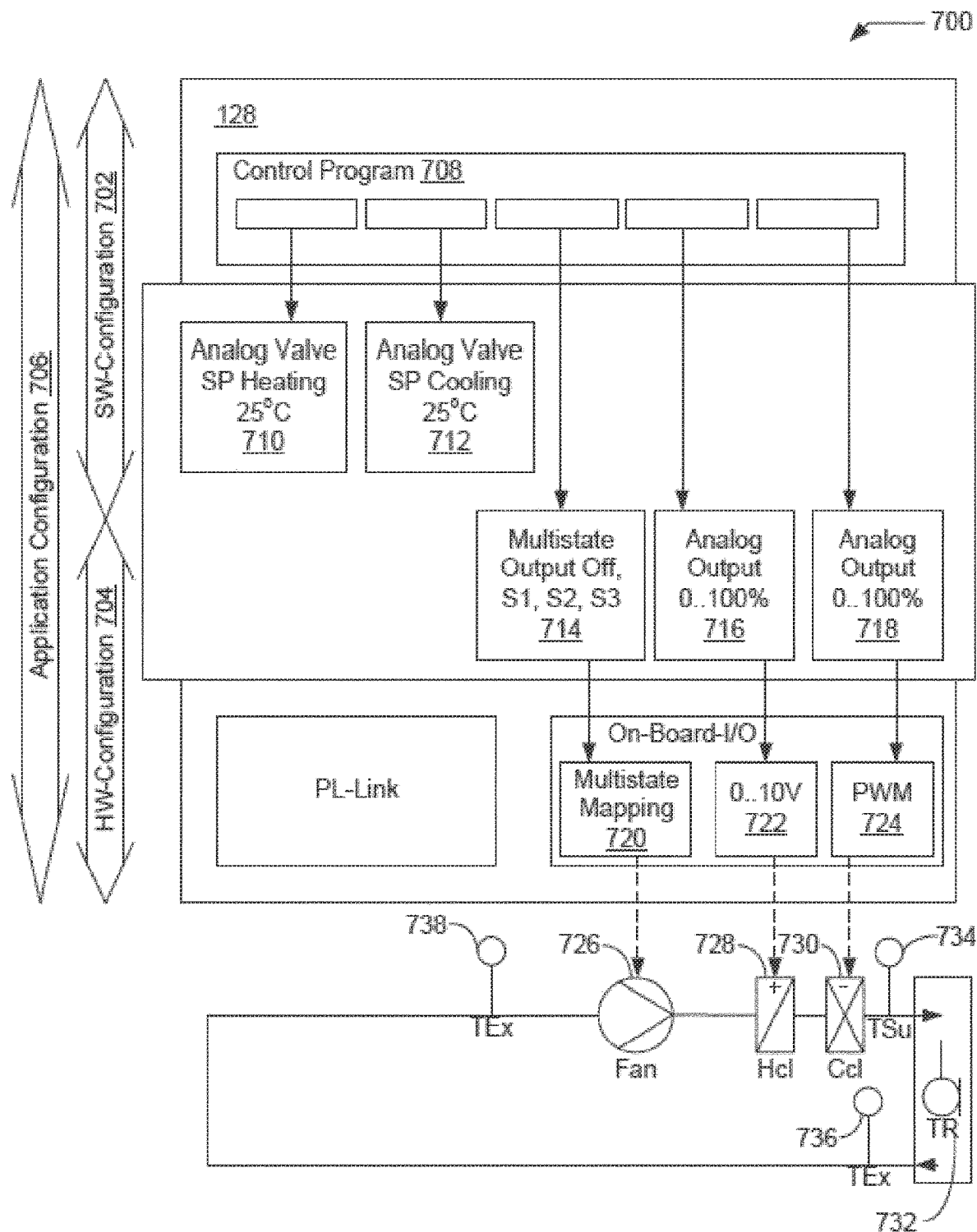
FIG. 7 illustrates an exemplary diagram of the software and hardware configuration of an application for a common automation system controller 128 of FIG. 1.

FIG. 7 illustrates an exemplary diagram of the software and hardware configuration of an application for a common automation system controller 128 of FIG. 1. In FIG. 7, an exemplary diagram 700 of the software 702 and hardware 704 configuration of an application 706 for a common automation system controller 128 of FIG. 1 is depicted. The software configuration 702 configuring data for control programs, operation & monitoring, and engineering & commissioning functions. The software configuration 702 further includes configuring data for the common automation system controller's role (i.e., control blinds, fans, valves, lights) in the BAS 100 and configuring virtual and real interface values for control applications. The software configuration 702 may include control programs 708 that originated as an application type in the library 608. Examples of control programs include heating applications, cooling applications, and blind controls to give a few examples. The control programs 708 may have parameters that are initially set (i.e., predefined set points), such as analog value set point for heating at 26 degrees Celsius 710 and analog value set point for cooling set to 22 degrees Celsius 712.

The hardware configuration 704 configures data for peripheral device, field buses, and data acquisition (such as sensors). The hardware configuration data 704 may also include configuring data for supporting sensors, actuators, and networked peripheral devices. The hardware configuration 704 may include configuration of outputs and inputs. In the current example, multistate outputs are configured for "Off", "S1", "S2", and "S3" 714 and two sets of analog outputs are configured to have a range of 0 to 100 percent 716 and 718. The outputs 714-718 are associated with input and output connections 720-724 on the I/O board that may be connected or coupled to the common automation system controller 128. The input and output connections 720-724 may be connected to devices, such as fan 726, heating unit 728, and cooling unit 730. The PL-Link network may also be configured to communicate with sensors, such as thermostat 732, supply temperature sensor 734 and exhaust temperature sensors 736 and 738.

Figure 8:
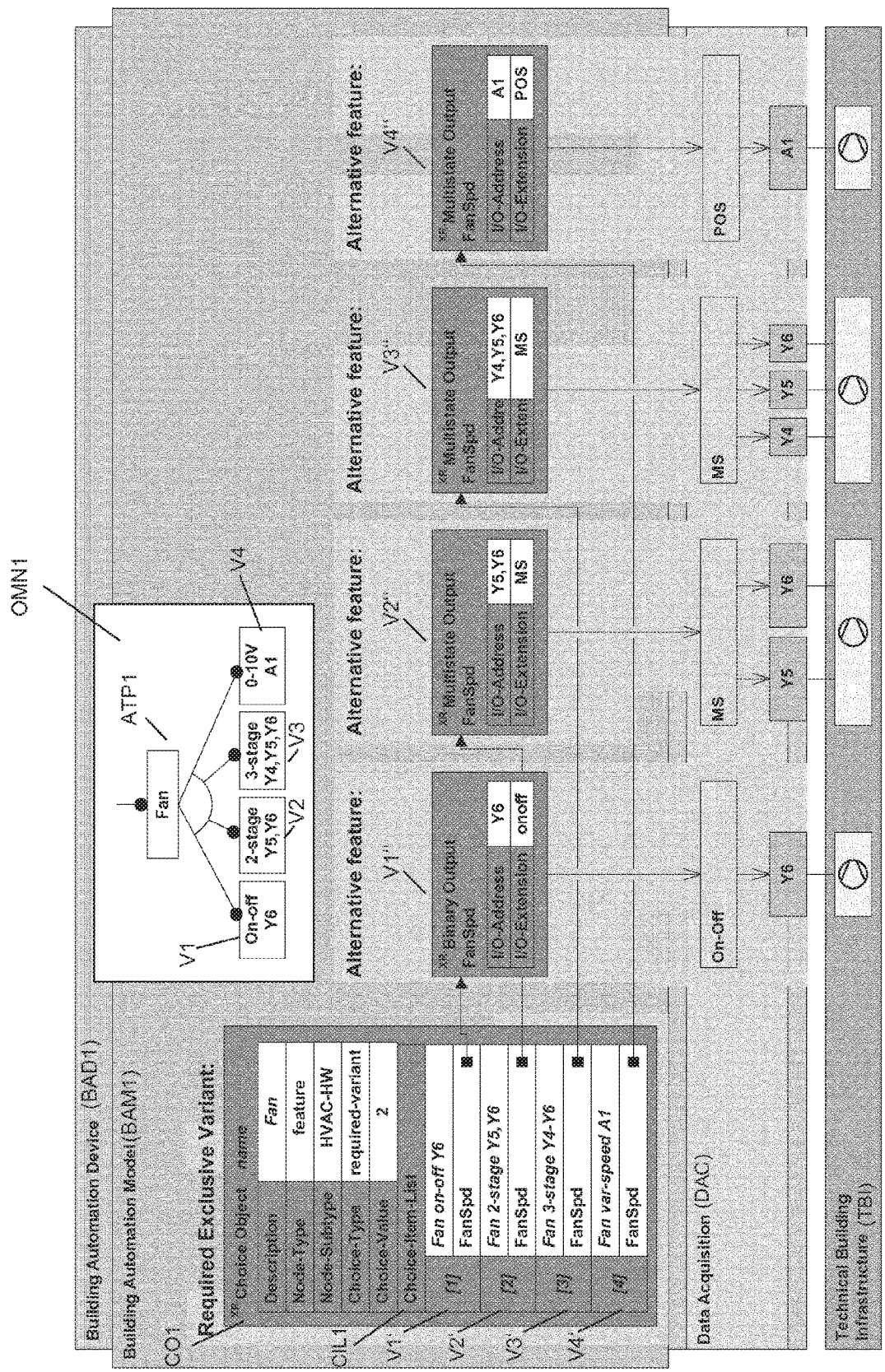
FIG. 8 illustrates an exemplary user selectable element with graphical representation for configuring an exemplary part of an application type.

FIG. 8 illustrates an exemplary user selectable feature element (e.g. choice object) for configuring the fan hardware application part ATP1 of an exemplary application type AT.

An application type AT represents the whole application. An application type comprises application type parts ATP1. All application type parts ATP1 of an entire application are building the respective application type. Application type parts ATP1 can be embodied as options or variants V1 to V4 in form of choice objects. The choice objects CO1 are the base to build a choice menu (drop-down or graphical) for user selection.

In FIG. 8 as exemplary application type part ATP1 a fan is depicted as part of an exemplary building automation model and an exemplary application type. The fan in FIG. 8 has a variability of four possible variant V1 to V4. Variability V1 represents a fan having one speed stage, variability V2 represents a fan having two speed stages, variability V3 represents a fan having three speed stages, variability V4 represents a fan having variable speed stages. In FIG. 8 the fan AT1 and his four variants V1 to V2 are illustrated in an exemplary Object Modeling Notation OMN1, which shows a part of the underlying building automation model BAM1. A respective configured fan is representing a building automation device BAD1.

Application-Types

An Application-Type AT represents a pre-engineered/pre-programmed application which may be customized to meet job-specific requirements by parameterizing/configuring respective configuration values V1 to V4. The resulting application, which may also be referred to as Application-Instance, comprises the SW- and HW-Configuration of the configured respective application type parts ATP1. The SW-Configuration (Software Configuration) comprises the control program (e.g. PLC code (e.g. SIMATIC S7 code) and data) and the BA-Objects (building automation objects) representing the virtual and interface values of the control program. The HW-Configuration (Hardware Configuration) comprises the BA-Objects representing the sensors, actuators and networked peripheral devices (e.g. room units with local operation and monitoring) as well as the configuration data for the respective data acquisition functions. The HW- and SW-Configuration provides functionality for one or many rooms with one or many room segments including lighting, shading, HVAC, etc.

Variability of Application-Types

Application-Types may be pre-loaded on an automation device or be stored in an application library. To minimize the number of library entries, to manage and administer the library content easier and to support different engineering flexibility levels in a uniform way, the number of different application type parts ATP1 have to be kept small and the variability of an Application-Type has therefore to be increased. This required structural variability of such an application type part ATP1 will be achieved by a maximization principle. An application type part ATP1 includes the communalities and all supported variability V1 to V2. Optional and alternative features which are not part of the desired application will be removed or set inexistent while configuring an application.

Configuration of an Application Type Part

An application type part ATP1 can be configured in a simple way by selecting dedicated features provided by graphical elements (based on choice objects). By selecting the respective variant V1 to V4 the user determines which instances he wants to have in an application configuration.

The selection of required features can be accomplished by using an adequate engineering system or application configurator in textual form and/or by using a graphical user interface.

Advantageously the selection of required features V1 to V2 of an application type part ATP1 is accomplished in a graphical way. This is more user friendly and reduces errors.

Configuring application type parts ATP1 (representing for example fans, lights, blinds, etc.) by selecting choices regarding HW- and/or SW-Variability) increases also the efficiency during the engineering and configuration phase. Advantageously the selection of choices is accomplished by respective graphical elements which a user can select by using an adequate graphical interface.

Advantageously the graphical editor or the graphical user interface dialogs with the necessary feature menus for selection of variants V1 to V4 is fully generic and is based on the respective defined application type part ATP1 with its respective building automation (BA) object model BAM1.

In FIG. 8 the choice object CO1 for configuring for configuring the application type part ATP1 representing a fan, comprises a choice-item-list CIL1 with four entries V1' to V4' which correspond to the four (selectable) variants V1 to V4 of the application type part ATP1 (fan). As mentioned above the variants V1 to V4 are representing a 1-stage fan, a 2-stage fan, a 3-stage fan, and a variable speed fan. Of course also n-stage fans are possible. With the options of variants V1' to V4' provided in the choice-item-list CIL1 of the application type part ATP1 the user can select and determine which instance of a fan he wants to have in the application: 1-stage fan, a 2-stage fan, a 3-stage fan, or a variable speed fan.

FIG. 8 illustrates in an exemplary object modeling notation the relationship of the user selectable options V1' to V4' provided in the choice-item-list CIL1 with the alternative features V1" to V4" for the configuration of the respective building automation device (BAD1) used in the implementation of the application. The exemplary object modeling notation shows also the data structure of the respective alternative features V1" to V4" (1-stage fan, a 2-stage fan, a 3-stage fan, or variable speed fan).

In a computerized data acquisition step (DAC) the data structures of the selected options of the application types for the application are assembled and mapped to the existing technical building infrastructure TBI used for implementing the application.

Figure 9:
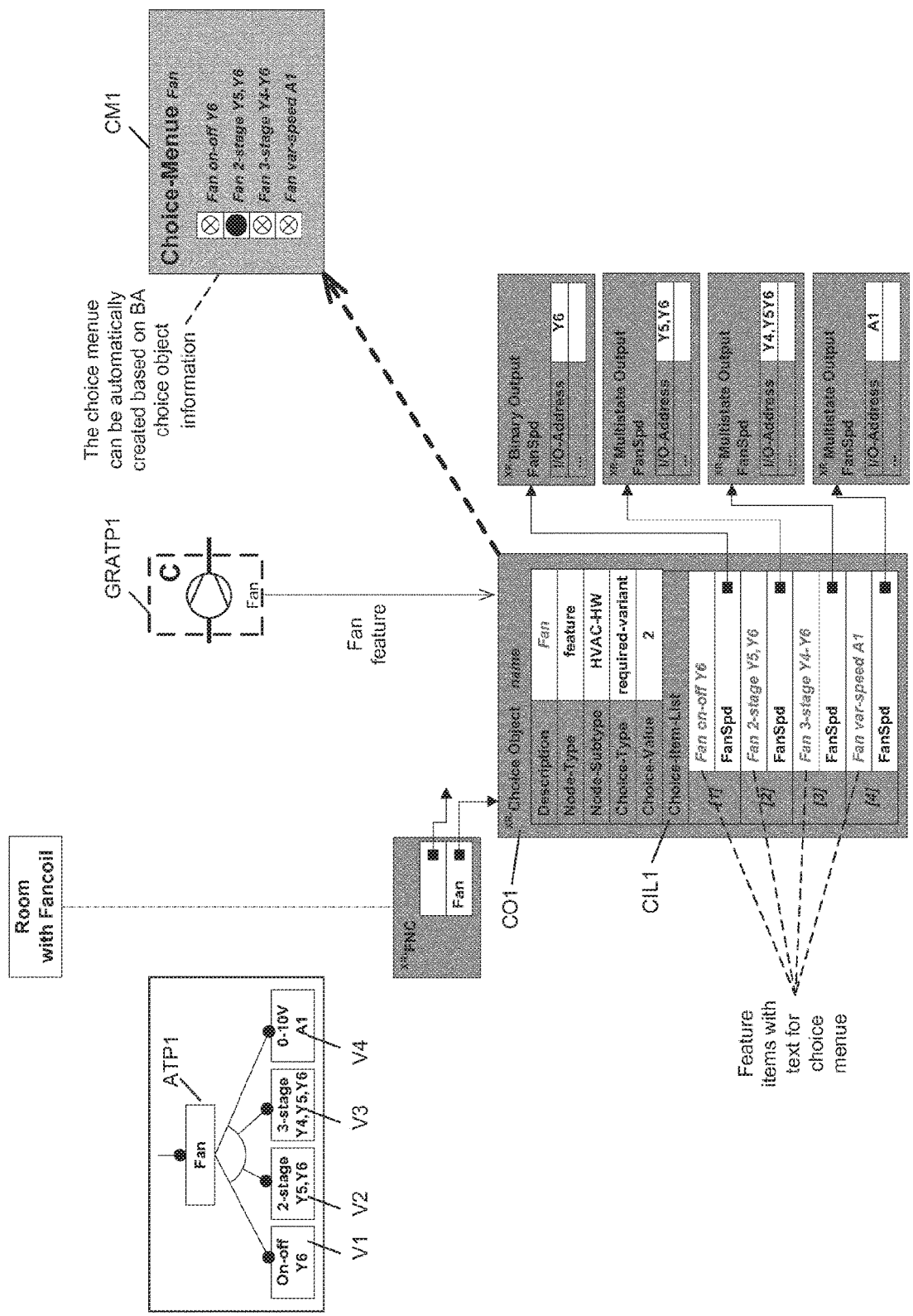
FIG. 9 illustrates a first exemplary Choice-menu on textual base for the application type part as illustrated in FIG. 8.

FIG. 9 illustrates a first exemplary Choice-menu on textual base for a part of the application type illustrated in FIG. 8. The choice-menu CM1 for the application type part ATP1 (fan) can be generically created based on choice object information, this means based on the information defined in the feature element (represented by the respective choice object) and its item list CIL1. In FIG. 9 the choice-menu CM1 is realized as a drop-down menu or drop-down list, wherein the data for the drop-down menu (list) is provided by the choice object.

If activated, the drop-down list shows a list of possible options for the application type fan: 1-stage fan, a 2-stage fan, a 3-stage fan, or variable speed fan. The user can select an option (feature) for the configuration. In general, there are options, variants and optional variants possible.

In FIG. 9 is indicated that the application type part ATP1 (fan) is part of an application type "Fancoil" (FNC), which is applied in a room ("Room with Fancoil"). In FIG. 9 the element GRATP1 shows a graphical symbol representing the application type part fan ATP1.

Advantageously a graphical symbol representing an application type part is marked or highlighted if a user has no choice selection regarding the respective variants done yet, in FIG. 9 exemplary with the bold typed letter "C".

Figure 10:
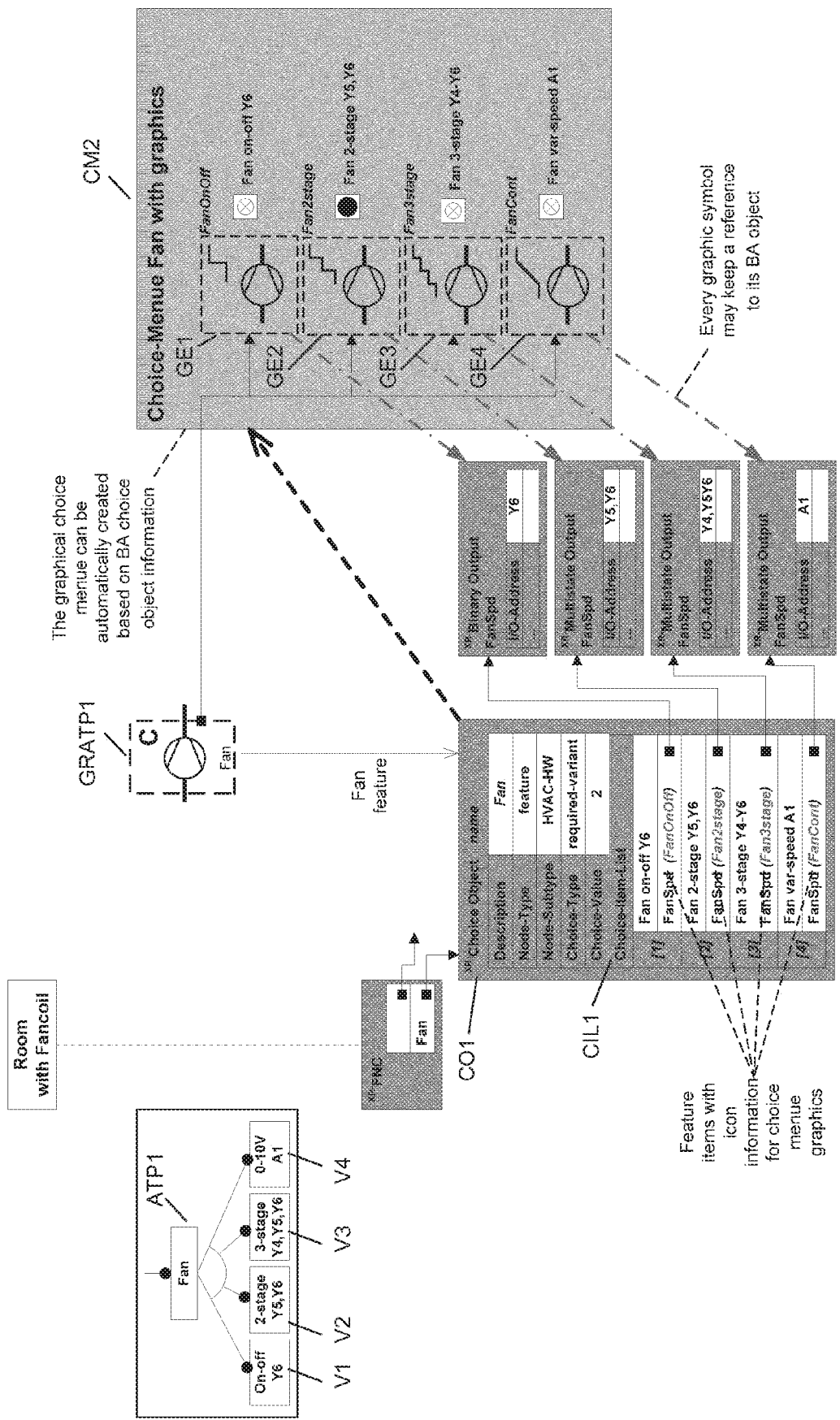
FIG. 10 illustrates a second exemplary Choice-menu on graphical base for the application type part as illustrated in FIG. 8.

FIG. 10 illustrates a second exemplary Choice-menu CM2 on graphical base for the application type part ATP1 (fan) as illustrated in FIG. 8. The depiction of FIG. 10 shows a graphical extension of exemplary choice-menu CM2 for the application type part AT1P (fan) as illustrated in FIG. 8. The choice-menu CM2 for the application type part ATP1 (fan) can be generically created based on choice object information, this means based on the information defined in the feature element (represented by the respective choice object) and its item list CIL1. In FIG. 10 the choice-menu CM2 is realized as a graphical menu, wherein the graphical data for the menu is provided by the respective choice object (feature items with icon information for graphical menu).

The second exemplary choice-menu CM2 for configuring the application type part ATP1 (fan) comprises graphics, showing for each variant a respective graphical symbol (or graphical element) GE1 to GE4, wherein every symbol GE1 to GE4 is keeping a reference to its BA object. The reference from the graphical element to the respective BA object is automatically created during menu generation.

Also in FIG. 10 is indicated that the application type part ATP1 (fan) is part of an application type "Fancoil" (FNC), which is applied in a room ("Room with Fancoil"). Also in FIG. 10 the element GRATP1 shows a graphical symbol representing the application type part fan ATP1.

Figure 11:
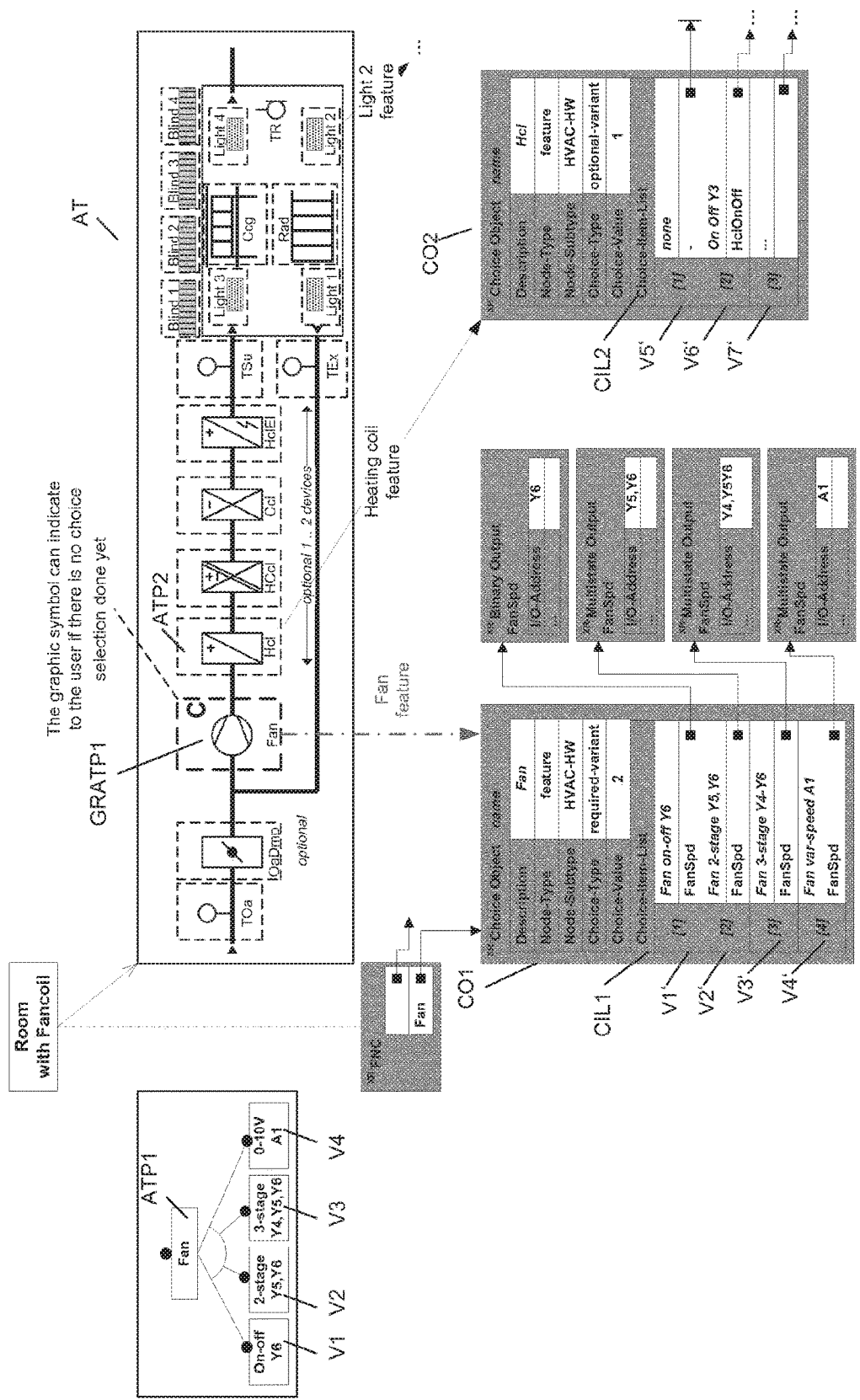
FIG. 11 illustrates an exemplary application type for an application having the exemplary fan application type part of FIG. 8.

FIG. 11 illustrates an exemplary application type AT for an application having the exemplary fan application type part ATP1 of FIG. 8. In FIG. 11 the exemplary application type AT is illustrated by using an exemplary installation graph (e.g. plant graph) notation.

FIG. 11 illustrates an exemplary application type AT "Fancoil (FNC)" for a room having the exemplary application type "Fancoil" which comprises the exemplary fan application type part ATP1 of FIG. 8 comprising the four variants V1 to V4 (1-stage fan, a 2-stage fan, a 3-stage fan, or variable speed fan). The exemplary application type AT for e.g. a room, a building or a plant depicts apart from the fan ATP1 further application type parts, e.g. an application type part ATP2 (Hcl) representing a heating coil.

Advantageously in the installation graph an application type part is marked or highlighted if a user has no choice selection regarding the respective variants done yet, in FIG. 11 exemplary with the bold typed letter "C".

For the fan application type part ATP1 the variants V1 to V4 are chosen by using the choice object CO1 comprising the choice-item-list CIL1 with the options V1' to V4'. For the heating coil (Hcl) application type part ATP2 a user can by using the choice object CO2 comprising the choice-item-list CIL2 one of the exemplary options V5' to V7' for configuring the heating coil (Hcl) application type part ATP2.

FIG. 11 illustrates in an exemplary installation graph notation exemplary application types parts supporting a lot of HW and SW variability (by respective choice objects CO1, CO2).

The installation graph notation of FIG. 11 comprises many building elements representing HW and/or SW choices. An application type e.g. a fan, has a reference to the respective building automation (BA) choice object CO1, CO2, which comprises all necessary information to build up a choice-menu CM1, CM2 (see FIGS. 9 and 10) for the selection of possible variants for the respective application type (e.g. fan) in either textual or graphical manner. In FIG. 11 the exemplary application type part ATP1 (fan) is represented in the installation graph notation by the graphical symbol GRATP1.

Knowing the relation to the BA choice objects CO1, CO2, this enables the possibility to automatically build up the required graphic elements for each single variant/option from, e.g., a graphic repository. Every single graphic element can keep the reference to the respective BA variant/option object. The BA choice objects CO1, CO2 as well as the respective graphical representation can be flat or nested (in multiple levels).

Figure 12:
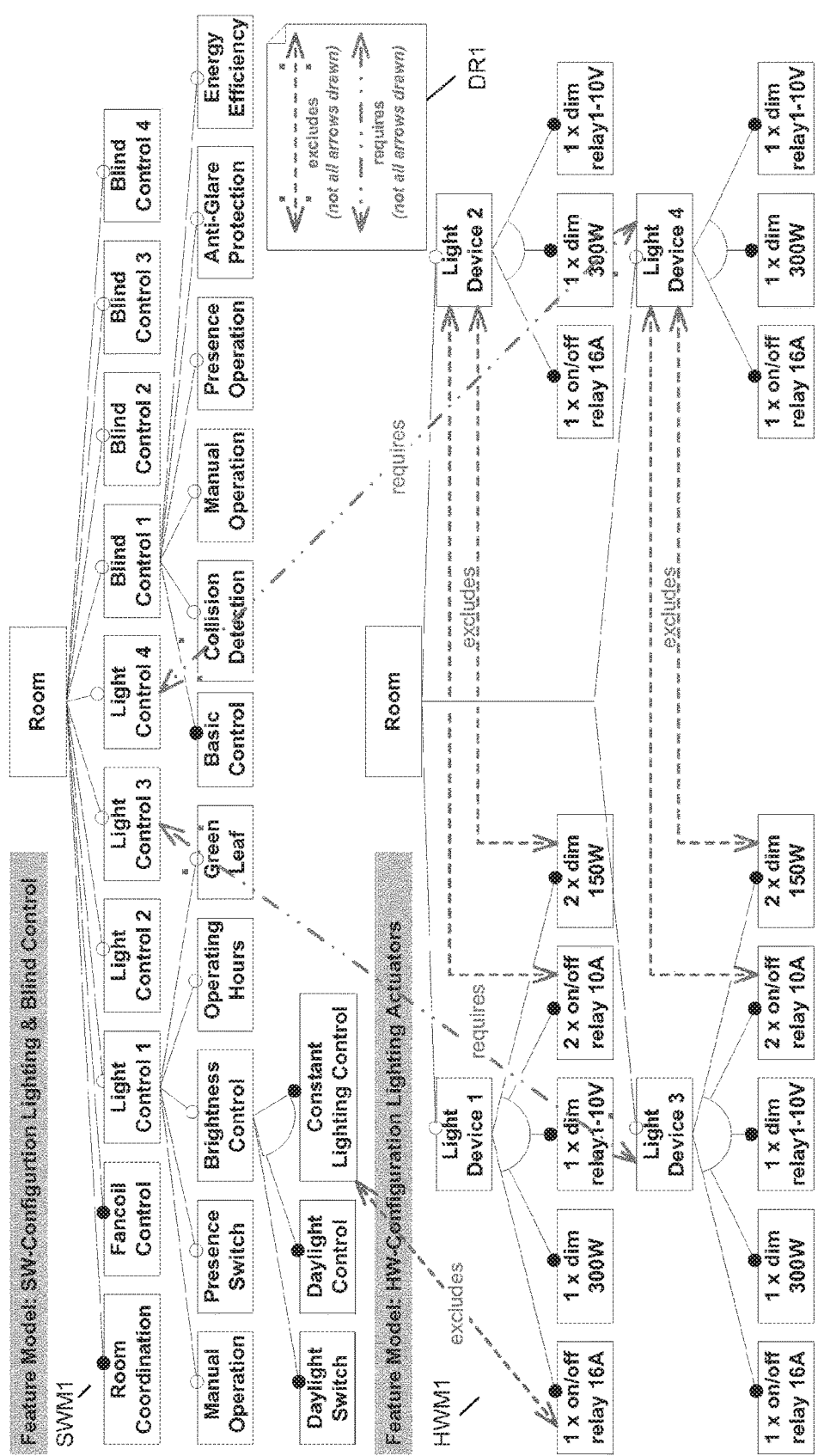
FIG. 12 illustrates exemplary dependencies between Hardware features and Software features.

FIG. 12 illustrates exemplary dependencies between Hardware features and Software features of application types used for room automation. The upper part of FIG. 12 depicts a feature model SWM1 for an exemplary SW-configuration "Lighting & Blind Control". The lower part of FIG. 12 depicts a feature model HWM1 for an exemplary HW-configuration "Lighting Actuators".

There can be dependencies between elements of the feature model SWM1 for the SW-configuration, there can be dependencies between elements of the feature model HWM1 for the HW-configuration, and there can be dependencies between elements of the feature model SWM1 for the SW-configuration and elements of the feature model HWM1 for the HW-configuration.

Constraints: Dependency Rules (DR1) in Application Types

The dependencies can represent rules DR1 or constraints between the respective elements. In FIG. 12 the arrow between elements represents a "require"-constraint between these elements (e.g. features). The double arrow between elements represents an "exclude"-constraint between these elements. FIG. 12 illustrates some exemplary constraints between elements. The "require"-constraint and the "exclude"-constraint are exemplary constraints. There are further dependency rules DR1 feasible.

There are many different constraints between BA choices which means that after selection of a choice variant or option there might be other variants and options from other choices required, excluded or suggested. These dependency rules DR1 may work between HW choices, between SW choices and between HW and SW choices. The complete dependency rule set is defined in the BA object model and kept with the BA choice object which is part of the respective application type.

BA choice variants and options can have an optional dependency name. This enables the definition of exclude, requires and suggests dependencies in other BA choice variants and options.

Apply Dependencies for Efficient and Guided Choice Selection:

A rule engine (e.g. a software module) reads and processes these dependency rules DR1. The rule engine can be performed as an executable software module of the processor of the graphical Application Configurator. The rule engine can also be provided by a web service via a network (e.g. Internet, Cloud) for the graphical Application Configurator. A field device can act as Application Configurator, an Application Configurator can also realized as a dedicated device having processor means, memory, and optionally a network interface.

The user is guided and supported during the choice selection process. This allows an efficient selection of choices by the user.

Exemplary Workflow Scenario

A typical workflow for Application type configurations starts with selection of the HW choices. After selection of such a HW variant/option, the system will automatically activate required variants/options (typically SW realted items) and deactivate <excluded> variants (if there are any) according to the constraint rules. In addition the system may suggest additional variants/options to the user. Finally the user also need to select remaining SW choices (typically superior and coordination functions). The system automatically updates the plant graphics according to the selections and constraint rules DR1. This provides direct visual information on selected items. It also indicates to the user which choices aren't yet selected (e.g., by showing an indication "C" or highlighting in the graphics), and which of them are already selected.

In addition the active rule set avoids selection of conflicting items according to the defined rules in the application type.

Figure 13:
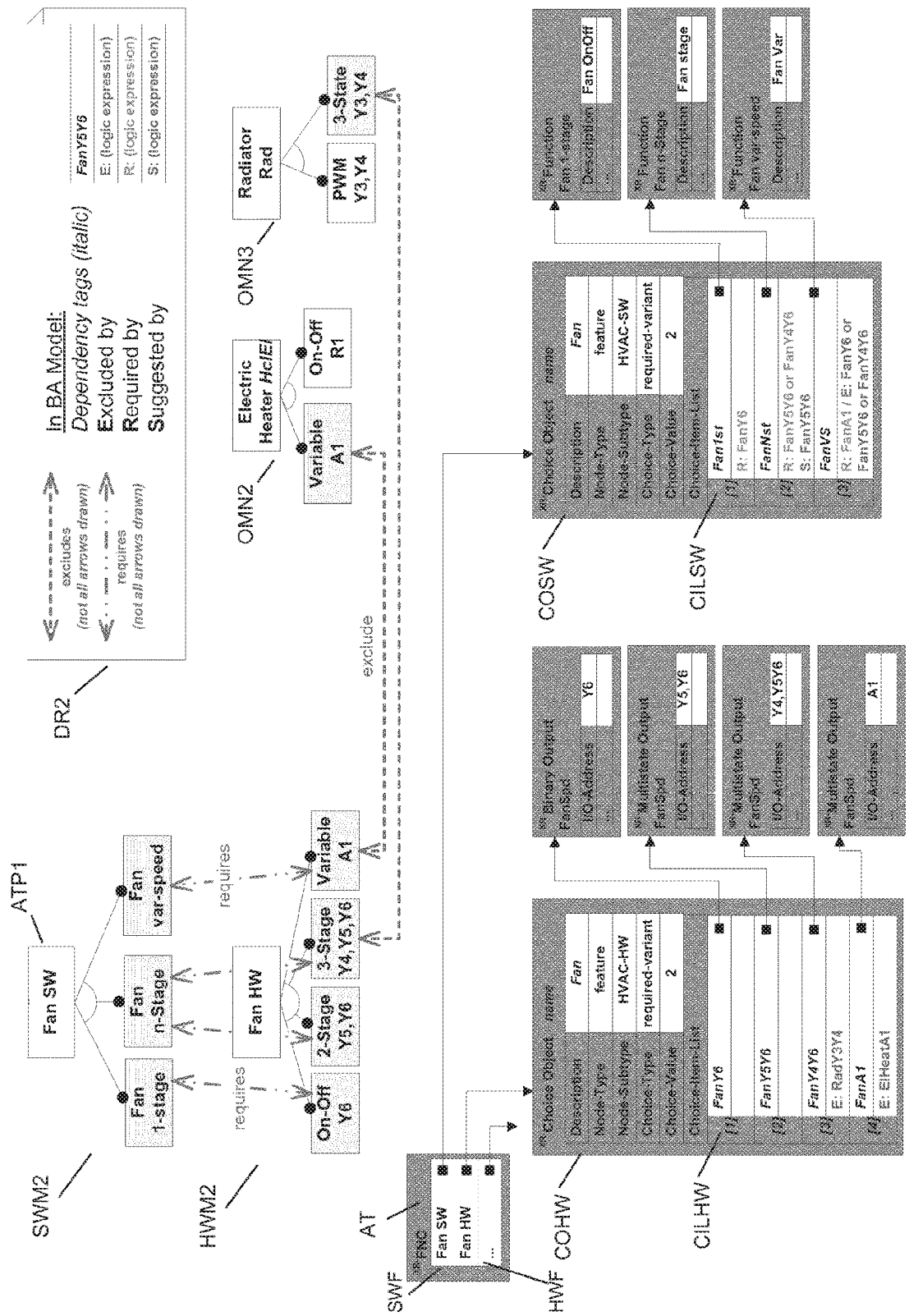
FIG. 13 illustrates exemplary dependency rules for the application type part illustrated in FIG. 8.

FIG. 13 illustrates exemplary dependency rules DR2 used in a building automation model (BA model) for the application type "fan" illustrated in FIG. 8. The exemplary set of dependency rules DR2 are illustrated in the box shown in the right upper corner of FIG. 13. Exemplary dependency rules DR2 are "excluded", "required", and "suggested". In FIG. 13 (upper part) the dependency rules are illustrated by an "arrow notation". The arrow notation shows the respective dependencies between elements of the building automation (BA) model.

In FIG. 13 in the area of the top left corner for the application type part ATP1 "fan" the software features are illustrated in an object model notation SWM2 and the hardware features are illustrated in an object model notation HWM2. Furthermore the dependency rules DR2 between software features and hardware features of the application type part ATP1 "fan" are illustrated by the arrow notation. Also the dependencies of the application type part "fan" to other application type parts (e.g. "Electric Heater", "Radiator") are exemplary shown in FIG. 13.

The application type parts "Electric Heater" and "Radiator" with the respective structure are also shown in an object modeling notation. The model OMN2 shows the "Electric Heater", OMN3 shows the "Radiator".

The low range of FIG. 13 illustrates an exemplary application type AT (exemplary a fancoil FNC) including the application type parts for fan SW and fan HW (SWF, respective HWF). The SW and HW application parts of the application type AT are each represented by choice objects COHW and COSW each comprising the respective choice-item-list CILHW, CILSW.

In FIG. 12 and FIG. 13 the exemplary dependency rules for "exclude"-constraints are illustrated with dashed arrows and the dependency rules for "requires"-constraints are illustrated with dashed-dotted arrows.

FIGS. 14A and B illustrate an exemplary flow diagram (part 1 shown in FIG. 14A, part 2 shown in FIG. 14B) for performing a graphical configuration of a common automation system controller. The flow diagram for configuring an application type as illustrated in FIG. 14A has as first element the starting point SP (shown in double circle) "Configure Application Type". The following diagram elements (rectangles for process steps; rhombi for decisions) comprise the process steps for performing the configuration, connected by respective arrows. The flow diagram in FIG. 14A ends with the mark M. FIG. 14B starts with mark M and continues the process steps. If a user has finalized the choice selections the system (means the configurator) generates a list of choice selections. The flow diagram illustrated in FIG. 14B end with the end point symbol (end) EP.

Optionally based on the list of choice selections a respective configuration file is generated automatically by the processor means and software means of the configurator or configuration manager. The configurator can be a field device or a separate device having adequate processing and software means.

In principle the configuration file can also be generated by using a web service. Via the web service a user is provided with an adequate graphical user interface for making his selections and choices. Based on the selections and choices the web service can generate the respective configuration files. In this embodiment the configurator or the respective field device requires a adequate connection (e.g. Internet, Intranet) to the service provider.

The configuration service can be provided as software as a service (SaaS) in a cloud computing implementation.

The flow diagram illustrated in FIGS. 14A, 14B for perform an implement a method for configuring a common automation system controller, wherein the method steps comprising:

providing a library of application types, wherein an application type comprises a building automation (BA) object model and a graphical representation;
  selecting an application type from the library of application types;
  displaying the graphical representation of the selected application type on a graphical output device (e.g. monitor, tablet or touchpanel), wherein the graphical representation of the application type comprises user selectable graphical elements (e.g. choice elements) for configuring the application type;
  configuring the application type by selecting graphical elements (e.g. choice elements providing different variants and options represented by graphical elements), wherein based on dependency rules only such graphical elements of the application type which are compatible to the selected graphical elements are provided on the graphical output device;
  generating a configuration file by a configuration manager, wherein the configuration file comprises information regarding the selected feature (choice elements).

The generated configuration file can be used for the configuration of a common automation system controller, comprising:

a memory;
  an input/output interface; and
  a processor coupled to the memory executing an application with an application type with functions for a building automation system (BAS), wherein the application type is represented by the compiled application by an executable instance comprising an application interface specific to the functions employed and the input/output of the instance is coupled to mechanical equipment,
  wherein the executable instance does automatically align in the building automation system (BAS), based on an application type configuration, wherein the configuration is based on dependency rules.

Furthermore a building automation system can comprise a plurality of common automation system controllers, wherein the common automation system controllers are coupled via a building automation network.

The inventive approach for graphical application configuration selection as well as graphical operation & monitoring capabilities for room automation leads to a tremendous cost reduction regarding engineering efforts. Supporting a graphical way for application configuration also provides all required information for automatic operation & monitoring. The operation & monitoring graphic serves for all device and rooms instances based on the same set of feature selections.

Figure 15:
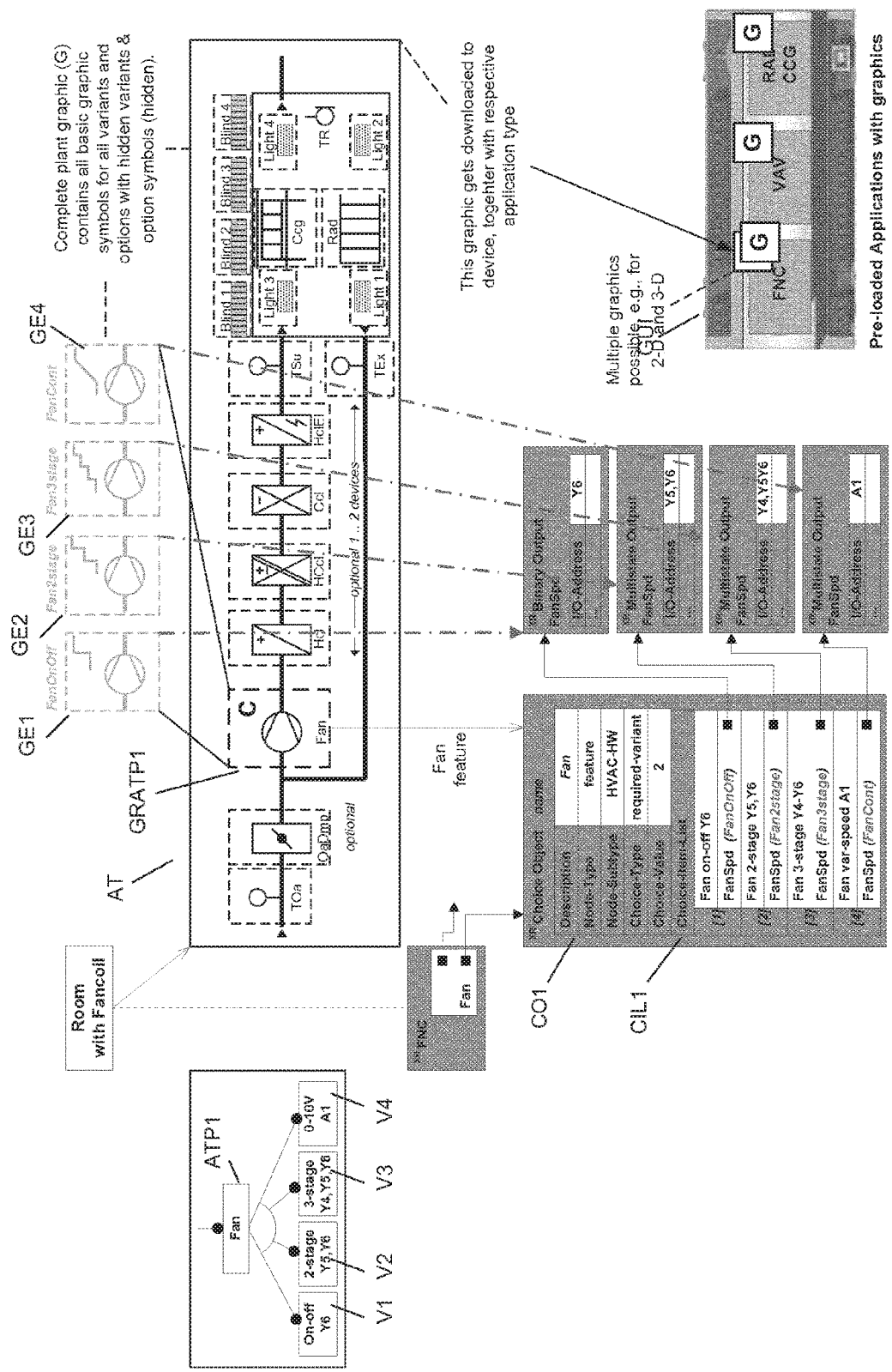
FIG. 15 illustrates an exemplary graphical user interface (GUI) for an exemplary application type.

FIG. 15 illustrates an exemplary graphical user interface GUI for an exemplary application type AT comprising the application type part ATP1 (fan) as illustrated in FIG. 8. The application type part ATP1 (fan) exemplary has user selectable variants V1 to V4. The variants V1 to V4 can be selected by choice objects CO1.

The top right part of FIG. 15 shows an exemplary full plant graphic of the application type AT providing graphical elements for all possible variants and options.

At the bottom right part of FIG. 15 an exemplary preloaded controller having three preloaded application types with each having one or multiple preloaded full plant graphics.

Figure 16:
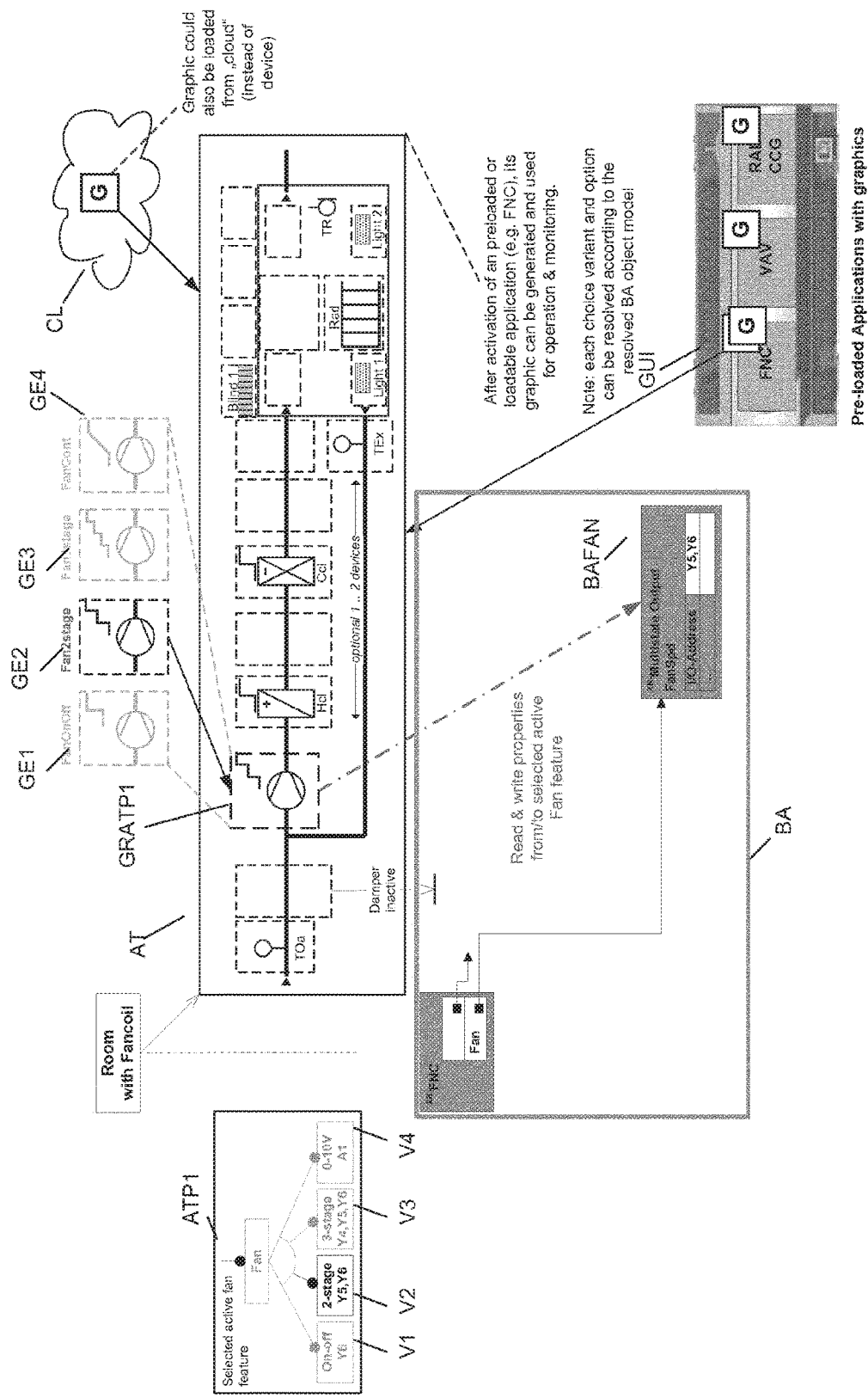
FIG. 16 illustrates an exemplary graphical user interface (GUI) for an exemplary application type for operating and/or monitoring during runtime.

FIG. 16 illustrates an exemplary graphical user interface GUI for an exemplary application type for operating and/or monitoring a common automation system controller 128 during runtime.

Based on the building automation object model BA, the graphical representation GE2 of the exemplary selected multi stage fan BAFAN is chosen for operating and/or monitoring the multi stage fan as part of the application type running on a common automation system controller 128. This is accomplished by adequate software and processing means.

Optionally the graphical elements for the graphical user interface GUI are preloaded on the common automation system controller. Optionally the graphical elements for the graphical user interface GUI are provided by a remote infrastructure (e.g. remote server or cloud infrastructure CL) via adequate communication connections (e.g. Internet, WLAN).

Self Learning Plant Graphics for Operation & Monitoring

With the preloaded Application-Type AT, the controller gets the respective graphic installation or plant preloaded as well. This graphic installation or plant includes all possible graphical symbols for all variants and options. Advantageously all these graphic elements are initially set to be invisible. Dependent on the selected/activated features in the building automation (BA) model, the respective graphic symbols gets shown and the user can directly use the resulting plant graphic for operation & monitoring without any additional configuration effort (learning graphics). There is no need to load a dedicated installation or plant graphic for operation & monitoring which fits to the configured application. In order to support different operation & monitoring graphics for a given Application-Type AT (like 2-D graphics, 3-D graphics or even country specific symbols in installation or plant graphic for, e.g., fan), there might be multiple graphic templates preloaded or loadable.

The configuration of the common automation system controller employing dynamic binding may be configured using the preloaded applications. The applications with configuration files (templates, include choice feature selections) may be preloaded prior to deployment at a factory. To load the application, a computer or workstation is typically employed. If static binding is being employed in the configuration of the common automation system controller, a computer or workstation is typically used to initially configure the application types, bind, compile and load the applications.

Exemplary advantages of the inventive approach for graphical configuration are among others:

providing graphical configuration for loadable & preloaded applications which can be adapted to typical main job-specific requirements by configuring parameters only (without programming);
  providing generic application configurator for configuring and adapting applications;

providing user guidance in regard to hardware and software dependencies in order to avoid misleading feature selections;

providing a mainly HW-oriented workflow view for the configuration of applications;

support selection software features based on selected hardware by applying predefined rules between features from the building automation model;

configuring a large number of applications/rooms with same features selections and configuration parameters (same configuration file (template)).

Providing a graphic for operation & monitoring on the device based on the selected variants and options (choice object feature selection) without additional engineering and loading of graphics.

A common automation system controller configured using a graphical approach for use in a building automation system. There is an increasing demand for flexible and adaptable room or building automation applications with an easy and intuitive way for application configuration. In pre-engineering as well as during installation and commissioning, the application configuration for preloaded or loadable device needs to be easily changeable and can be used for operating and/or monitoring.

The foregoing detailed description of one or more embodiments of the Building Synergistic Interface System for a Building Automation System has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method for configuring a common automation system controller, the method comprising:
providing a library of application types and application type parts wherein an application type and an application type part comprise a building automation object model and a graphical representation;
wherein each application type represents a pre-engineered or pre-programmed application customizable for job-specific requirements by parameterizing or configuring respective configuration values, and
wherein each application type comprises application type parts, wherein the application type parts of a respective application type define the respective application type, and wherein application type parts represent options or variants for the respective application type, the options or variant being embodied as choice objects;
receiving, via a user interface, a user selection of an application type from the library of application types;
displaying the graphical representation of the selected application type on a computer display device, wherein the graphical representation of the selected application type comprises user selectable graphical elements of choice objects embodying application type parts of the selected application type;
receiving, via the user interface, a user selection of displayed graphical elements representing choice objects embodying application type parts of the selected application type, to thereby configure the selected application type;
displaying, at the computer display device, only graphical elements of the application type parts that are compatible with the user-selected graphical elements, based on dependency rules;
wherein a complete set of the dependency rules is defined in the building automation object model and maintained with choice objects embodying application type parts of the selected application type;
determining if the selected application type employs static binding during engineering or dynamic binding at run time;
in response to determining the selected application type employs dynamic binding, loading the selected application type in a memory of the common automation system controller, where the selected application type has a plurality of functions including an application interface function;
binding the selected application type resulting in an executable application stored in the memory, where the application interface is specific to the plurality of functions; and
starting the executable application stored in the memory.

2. The method of claim 1, further comprising:
generating loadable configuration data by a configuration manager, wherein the configuration data comprises information regarding the selected choice objects represented by graphical elements.

3. The method of claim 1, wherein the graphical elements for the graphical user interface are preloaded on the common automation system controller.

4. The method of claim 1, wherein the graphical elements for the graphical user interface are provided by a remote infrastructure.

5. The method of claim 1, further comprising:
determining if the selected application type employs static binding or dynamic binding;
loading the application type in a memory of the common automation system controller by a processor if dynamic binding is determined, where the at least one application type has a plurality of functions including an application interface;
binding the at least one application type resulting in an executable application stored in the memory, where the application interface is specific to the functions employed; and
starting with the processor the executable application stored in the memory.

6. The method of claim 1, wherein the dependency rules having logical expressions for determining if choice object variants or options represented by graphical elements are excluded, required or suggested.

7. The method of claim 1, wherein the selectable graphical elements for configuring the application type comprise at least one of hardware elements or software elements.

8. The method of claim 1, wherein the application type employs positive or negative variability.

9. The method of claim 1, wherein unnecessary structural parts of the plurality of structural parts are removed during binding.

10. The method of claim 1, wherein the application type can be part of an application type library or pre-loaded on the common automation controller.

11. A non-transitory computer-readable medium comprising computer instructions for configuring a common automation system controller, the computer instructions being executable by a processor to:

provide a library of application types and application type parts wherein an application type and an application type part comprise a building automation object model and a graphical representation;

wherein each application type represents a pre-engineered or pre-programmed application customizable for job-specific requirements by parameterizing or configuring respective configuration values, and wherein each application type comprises application type parts, wherein the application type parts of a respective application type define the respective application type, and wherein application type parts represent options or variants for the respective application type, the options or variant being embodied as choice objects;

receive, via a user interface, a user selection of an application type from the library of application types;

display the graphical representation of the selected application type on a computer display device, wherein the graphical representation of the selected application type comprises user selectable graphical elements of choice objects embodying application type parts of the selected application type;

receive, via the user interface, a user selection of displayed graphical elements representing choice objects embodying application type parts of the selected application type, to thereby configure the selected application type;

display, at the computer display device, only graphical elements of the application type parts that are compatible with the user-selected graphical elements, based on dependency rules;

wherein a complete set of the dependency rules is defined in the building automation object model and maintained with choice objects embodying application type parts of the selected application type;

determine if the selected application type employs static binding during engineering or dynamic binding at run time;

in response to determining the selected application type employs dynamic binding, load the selected application type in a memory of the common automation system controller, where the selected application type has a plurality of functions including an application interface function;

bind the selected application type resulting in an executable application stored in the memory, where the application interface is specific to the plurality of functions; and start the executable application stored in the memory.

12. A common automation system controller, comprising:

a memory storing a library of application types and application type parts wherein an application type and an application type part comprise a building automation object model and a graphical representation;

an input/output interface; and a processor coupled to the memory;

wherein the application type represents a pre-engineered or pre-programmed application customizable for job-specific requirements by parameterizing or configuring respective configuration values;

wherein the application type comprises application type parts, wherein the application type parts define the application type, and wherein application type parts represent options or variants for the application type, the options or variant being embodied as choice objects; and wherein the processor is configured to:

receive, via the input/output interface, a user selection of an application type from the library of application types;

display the graphical representation of the selected application type on a computer display device, wherein the graphical representation of the selected application type comprises user selectable graphical elements of choice objects embodying application type parts of the selected application type;

receive, via the input/output interface, a user selection of displayed graphical elements representing choice objects embodying application type parts of the selected application type, to thereby configure the selected application type;

display, at the computer display device, only graphical elements of the application type parts that are compatible with the user-selected graphical elements, based on dependency rules;

wherein a complete set of the dependency rules is defined in the building automation object model and maintained with choice objects embodying application type parts of the selected application type;

determine if the selected application type employs static binding during engineering or dynamic binding at run time;

in response to determining the selected application type employs dynamic binding, load the selected application type, where the selected application type has a plurality of functions including an application interface function;

bind the selected application type resulting in an executable application, where the application interface is specific to the plurality of functions; and start the executable application.

13. The common automation system controller of claim 12, further comprising:

a mechanism for generating a graphical user interface for at least one of operating or monitoring the common automation system controller based on the building automation object model, the graphical representation of the selected application type and the selected graphical elements representing choice objects.

14. The common automation system controller of claim 12, wherein the selected application type is hierarchically configured with objects associated with the building automation system.

15. The common automation system controller of claim 12, further comprising:

an interface to a remote infrastructure for providing the building automation object model configuration for the remote infrastructure.

16. The common automation system controller of claim 15, wherein the remote infrastructure generates the graphical user interface for at least one of operation or monitoring for the common automation system controller.

* * * * *